US012093593B2

(12) United States Patent
Noguchi et al.

(10) Patent No.: US 12,093,593 B2
(45) Date of Patent: Sep. 17, 2024

(54) CONTROL DEVICE, INFORMATION TERMINAL, CONTROL METHOD, AND STORAGE MEDIUM

(71) Applicant: HONDA MOTOR CO., LTD., Tokyo (JP)

(72) Inventors: Jumpei Noguchi, Tokyo (JP); Takeshi Iijima, Tokyo (JP); Gaku Shimamoto, Tokyo (JP); Ayumu Mitomo, Tokyo (JP); Satoshi Nakamura, Tokyo (JP); Tatsuro Fujiwara, Tokyo (JP); Mizuki Owada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/374,338

(22) Filed: Sep. 28, 2023

(65) Prior Publication Data

US 2024/0111469 A1 Apr. 4, 2024

(30) Foreign Application Priority Data

Sep. 29, 2022 (JP) ................................ 2022-156590

(51) Int. Cl.

| | |
|---|---|
| ***G06F 3/14*** | (2006.01) |
| ***B60L 53/36*** | (2019.01) |
| ***G05D 1/00*** | (2006.01) |

(52) U.S. Cl.

CPC ................ *G06F 3/14* (2013.01); *B60L 53/36* (2019.02); *G05D 1/021* (2013.01)

(58) Field of Classification Search

CPC ........ G06F 3/14; B60L 53/36; B60L 2250/16; B60L 3/04; B60L 58/20; B60L 3/0046; B60L 53/305; B60L 53/68; G05D 1/021

See application file for complete search history.

(56) References Cited

U.S. PATENT DOCUMENTS

2016/0129799 A1* 5/2016 Kwon .................... B60L 53/38 320/108
2022/0063591 A1 3/2022 Inoue
2023/0174081 A1* 6/2023 Shimomura ....... B62D 15/0285 701/29.2
2023/0398890 A1* 12/2023 Hanashima ........... H02J 7/0071

FOREIGN PATENT DOCUMENTS

JP 2022-041514 A 3/2022

* cited by examiner

*Primary Examiner* — Hong Zhou

(74) *Attorney, Agent, or Firm* — Paratus Law Group, PLLC

(57) ABSTRACT

A control device for a moving body includes a control unit configured to communicate with an information terminal which is portable for a user of the moving body, and perform movement control on the moving body and charge control on a power supply device. The control unit is configured to start the moving body and the charge control, and, in response to receiving an action plan, if a progress state of the charge control does not reach a predetermined state, cause a display unit of the information terminal to display a third display image indicating the progress state, and if the progress state reaches the predetermined state, cause the display unit not to display the third display image, or cause the display unit to display it in an inconspicuous manner in comparison to a case where the progress state does not reach the predetermined state.

15 Claims, 19 Drawing Sheets

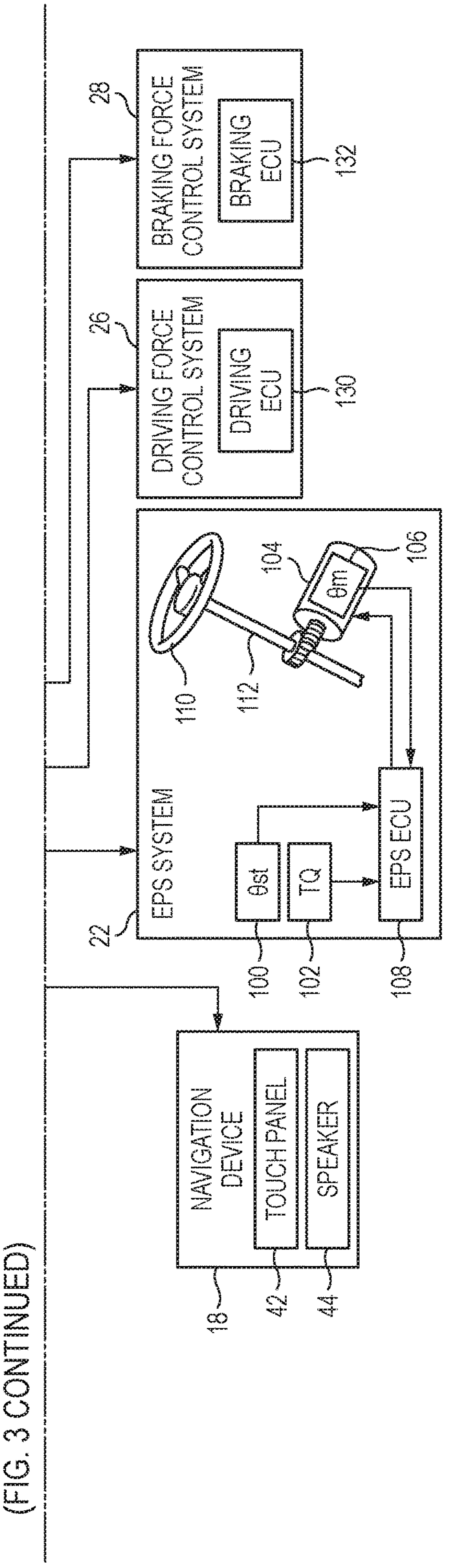
(FIG. 3 CONTINUED)

CONTROL DEVICE, INFORMATION TERMINAL, CONTROL METHOD, AND STORAGE MEDIUM

CROSS-REFERENCE RELATED ARTS

This application is based on and claims priority under 35 USC 119 from Japanese Patent Application No. 2022-156590 filed on Sep. 29, 2022, which is hereby incorporated by reference in its entirety.

TECHNICAL FIELD

The present disclosure relates to a control device, an information terminal, a control method, and a storage medium storing a control program.

BACKGROUND ART

In recent years, efforts have been actively made to provide access to sustainable transportation systems in consideration of vulnerable people among transport participants. In order to realize the above object, attention is focused on research and development to further improve safety and convenience of traffic through research and development related to automated driving.

In the related art, there is known a remote parking system that remotely operates a vehicle to park in a designated predetermined parking space or to cause the vehicle to exit from the parking space. A vehicle including a main power supply device (secondary battery) that supplies electric power to vehicle electrical components during normal vehicle traveling or during vehicle parking control, and an auxiliary power supply (capacitor) that supplies electric power to a safety device that decelerates or stops the vehicle when the main power supply device fails. JP2022-041514A describes a vehicle control device in which when an abnormality occurs in a first power supply device while parking assistance control is being executed, electric power is supplied from a second power supply device to a braking device and a shift switching device, and when an electric power storage amount of the second power supply device is monitored and the electric power storage amount becomes smaller than a predetermined value, the vehicle is stopped by controlling the braking device and the shift switching device.

SUMMARY

According to the vehicle control device disclosed in JP2022-041514A, it is possible to execute an appropriate process according to shortage of the electric power of the second power supply device during execution of the parking assistance control. However, the second power supply device (capacitor) has a property of being easily deteriorated when a high state of charge continues. Therefore, for example, the second power supply device discharges while an engine is stopped to keep a charge amount low, thereby reducing deterioration. Therefore, for example, at the time of exit of the vehicle in remote parking, the second power supply device needs time to be charged after the engine is started. However, JP2022-041514A does not describe a charge period of the second power supply device whose charge is performed after the engine of the vehicle is started. There is room for improvement in a control process for a charge period of a power supply device when a vehicle is started.

An object of the present disclosure is to provide a control device, an information terminal, a control method, and a storage medium storing a control program capable of reducing annoyance in waiting for charging a power supply device when a vehicle is started. The present disclosure will eventually contribute to development of sustainable transportation systems.

According to an aspect of the present disclosure, there is provided a control device for a moving body, including:

- a control unit configured to communicate with an information terminal which is portable for a user of the moving body, perform movement control on the moving body, and perform charge control on a power supply device for the movement control, in which
- the control unit is configured to:
  - cause a display unit of the information terminal to display a first display image for starting the moving body,
  - start the moving body and start the charge control based on an operation by the user on the first display image,
  - cause the display unit to display a second display image for receiving an action plan of the movement control along with the start of the moving body,
  - receive the action plan based on an operation by the user on the second display image, and
  - in response to receiving the action plan,
    - in a case where a progress state of the charge control does not reach a predetermined state, cause the display unit to display a third display image indicating the progress state, and
    - in a case where the progress state reaches the predetermined state, cause the display unit not to display the third display image, or cause the display unit to display the third display image in an inconspicuous manner in comparison to a case where the progress state does not reach the predetermined state.

According to another aspect of the present disclosure, there is provided a control method performed by a control device including a control unit configured to communicate with an information terminal which is portable for a user of a moving body, perform movement control on the moving body, and perform charge control on a power supply device for the movement control, the control method including

- causing, by the control unit, a display unit of the information terminal to display a first display image for starting the moving body,
- starting, by the control unit, the moving body and start the charge control based on an operation by the user on the first display image,
- causing, by the control unit, the display unit to display a second display image for receiving an action plan of the movement control along with the start of the moving body,
- receiving, by the control unit, the action plan based on an operation by the user on the second display image, and
- in response to receiving the action plan,
  - in a case where a progress state of the charge control does not reach a predetermined state, causing, by the control unit, the display unit to display a third display image indicating the progress state, and
  - in a case where the progress state reaches the predetermined state, causing, by the control unit, the display unit not to display the third display image, or causing, by the control unit, the display unit to display the third display image in an inconspicuous manner in comparison to a case where the progress state does not reach the predetermined state.

According to another aspect of the present disclosure, there is provided a non-transitory computer readable storage medium storing a control program for a control device to execute the above control method.

According to another aspect of the present disclosure, there is provided an information terminal which is portable for a user of a moving body, the information terminal including:

a control unit configured to communicate with a control device of the moving body; and a display unit, in which the moving body is configured to perform movement control on the moving body and perform charge control on a power supply device for the movement control, and the control unit is configured to:

cause the display unit to display a first display image for starting the moving body, start the moving body and start the charge control with respect to the control device based on an operation by the user on the first display image, cause the display unit to display a second display image for receiving an action plan of the movement control along with the start of the moving body, receive the action plan based on an operation by the user on the second display image, and in response to receiving the action plan, in a case where a progress state of the charge control does not reach a predetermined state, cause the display unit to display a third display image indicating the progress state, and in a case where the progress state reaches the predetermined state, cause the display unit not to display the third display image, or cause the display unit to display the third display image in an inconspicuous manner in comparison to a case where the progress state does not reach the predetermined state.

According to another aspect of the present disclosure, there is provided a control method performed by an information terminal which is portable for a user of a moving body and includes a control unit configured to communicate with a control device of the moving body, and a display unit, the moving body being configured to perform movement control on the moving body and perform charge control on a power supply device for the movement control, the control method including:

causing, by the control unit, a display unit to display a first display image for starting the moving body, starting, by the control unit, the moving body and start the charge control with respect to the control device based on an operation by the user on the first display image, causing, by the control unit, the display unit to display a second display image for receiving an action plan of the movement control along with the start of the moving body, receiving, by the control unit, the action plan based on an operation by the user on the second display image, and in response to receiving the action plan, in a case where a progress state of the charge control does not reach a predetermined state, causing, by the control unit, the display unit to display a third display image indicating the progress state, and in a case where the progress state reaches the predetermined state, causing, by the control unit, the display unit not to display the third display image, or causing, by the control unit, the display unit to display the third display image in an inconspicuous manner in comparison to a case where the progress state does not reach the predetermined state.

According to another aspect of the present disclosure, there is provided a non-transitory computer readable storage medium storing a control program for an information terminal to execute the above control method.

According to the present disclosure, there is provided a control device, an information terminal, a control method, and a control program capable of reducing annoyance in waiting for charging a power supply device when a vehicle is started.

BRIEF DESCRIPTION OF DRAWINGS

Exemplary embodiment(s) of the present invention will be described in detail based on the following figures, wherein.

DESCRIPTION OF EMBODIMENTS

Figure 1:
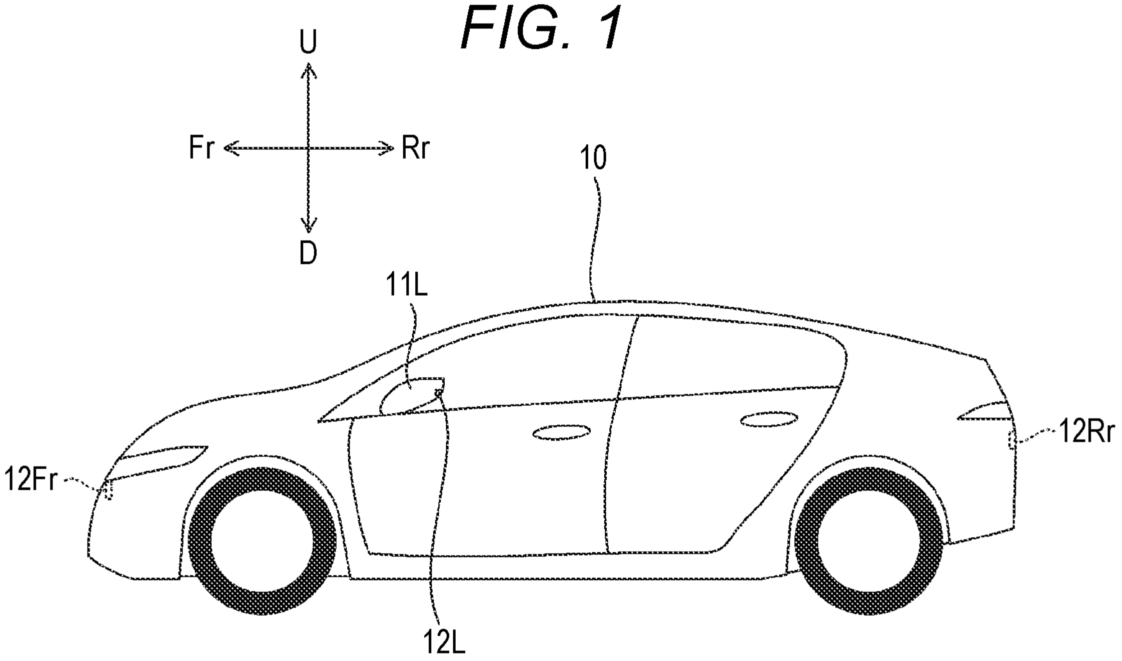
FIG. 1 is a side view showing an example of a vehicle whose movement is controlled by a control device of the present embodiment.

Hereinafter, embodiments of a control device, a control method, and a control program according to the present disclosure will be described in detail with reference to the accompanying drawings. The drawings are viewed in directions of reference numerals. In addition, in the present specification and the like, in order to simplify and clarify the description, a front-rear direction, a left-right direction, and an upper-lower direction are described according to directions viewed from a driver of a vehicle 10 shown in FIGS. 1 and 2, and in the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 Whose Movement is Controlled by Control Device>

Figure 2:
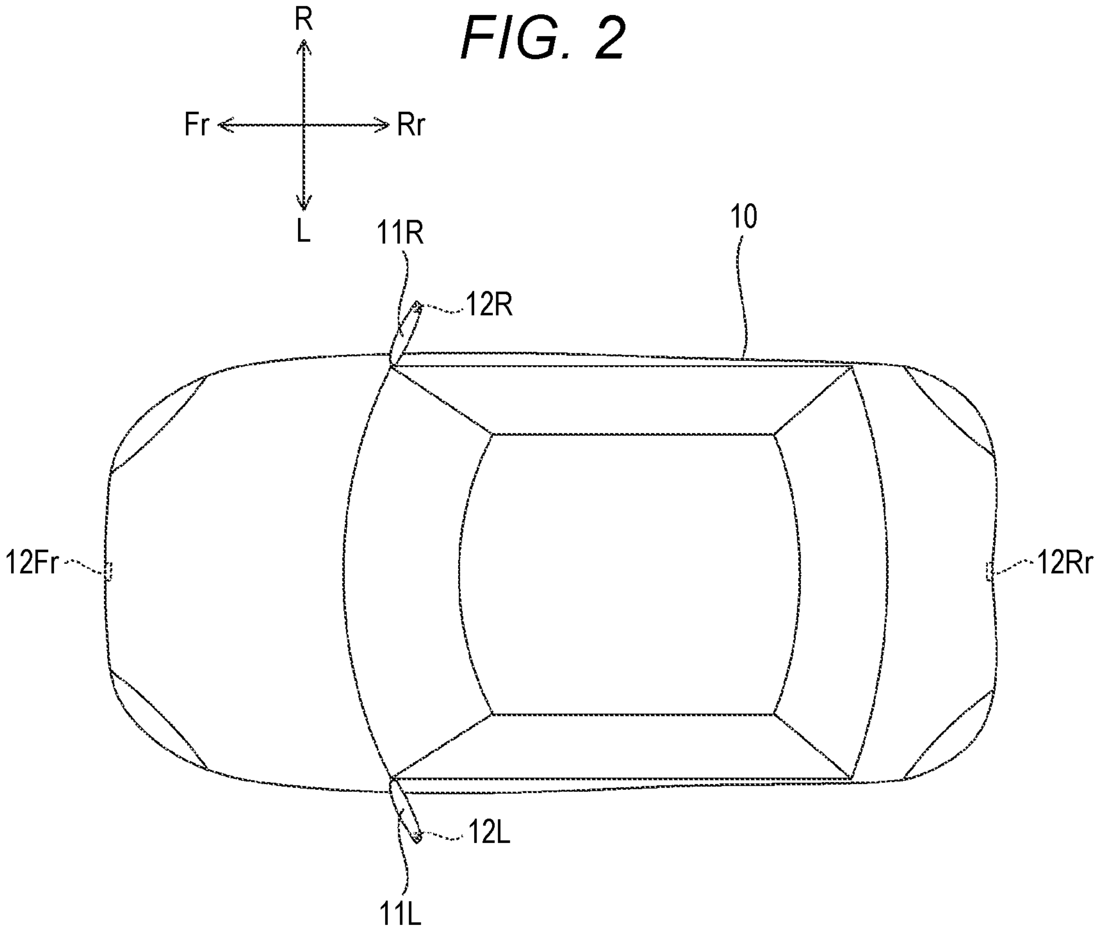
FIG. 2 is a top view of the vehicle shown in FIG. 1.

FIG. 1 is a side view showing the vehicle 10 whose movement is controlled by a control device in the present disclosure. FIG. 2 is a top view of the vehicle 10 shown in FIG. 1. The vehicle 10 is an example of a moving body in the present disclosure.

The vehicle 10 is an automobile including a drive source (not shown) and wheels including drive wheels driven by power of the drive source and driven wheels that are steerable. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or a combination of an electric motor and an internal combustion engine. In addition, the drive source of the vehicle 10 may drive the pair of left and right front wheels, the pair of left and right rear wheels, or the four wheels including the pair of left and right front wheels and the pair of left and right rear wheels. The front wheels and the rear wheels may both be driven wheels that are steerable, or the front wheels or the rear wheels may be driven wheels that are steerable.

The vehicle 10 further includes side mirrors 11L and 11R. The side mirrors 11L and 11R are mirrors (rearview mirrors) provided outside front doors of the vehicle 10 for the driver to check the rear side and a rear lateral side. Each of the side mirrors 11L and 11R is fixed to a main body of the vehicle 10 by a rotation shaft extending in a vertical direction, and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of the front side of the vehicle 10. The rear camera 12Rr is a digital camera that is provided at a rear portion of the vehicle 10 and captures an image of the rear side of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

<Internal Configuration of Vehicle 10>

Figure 3:
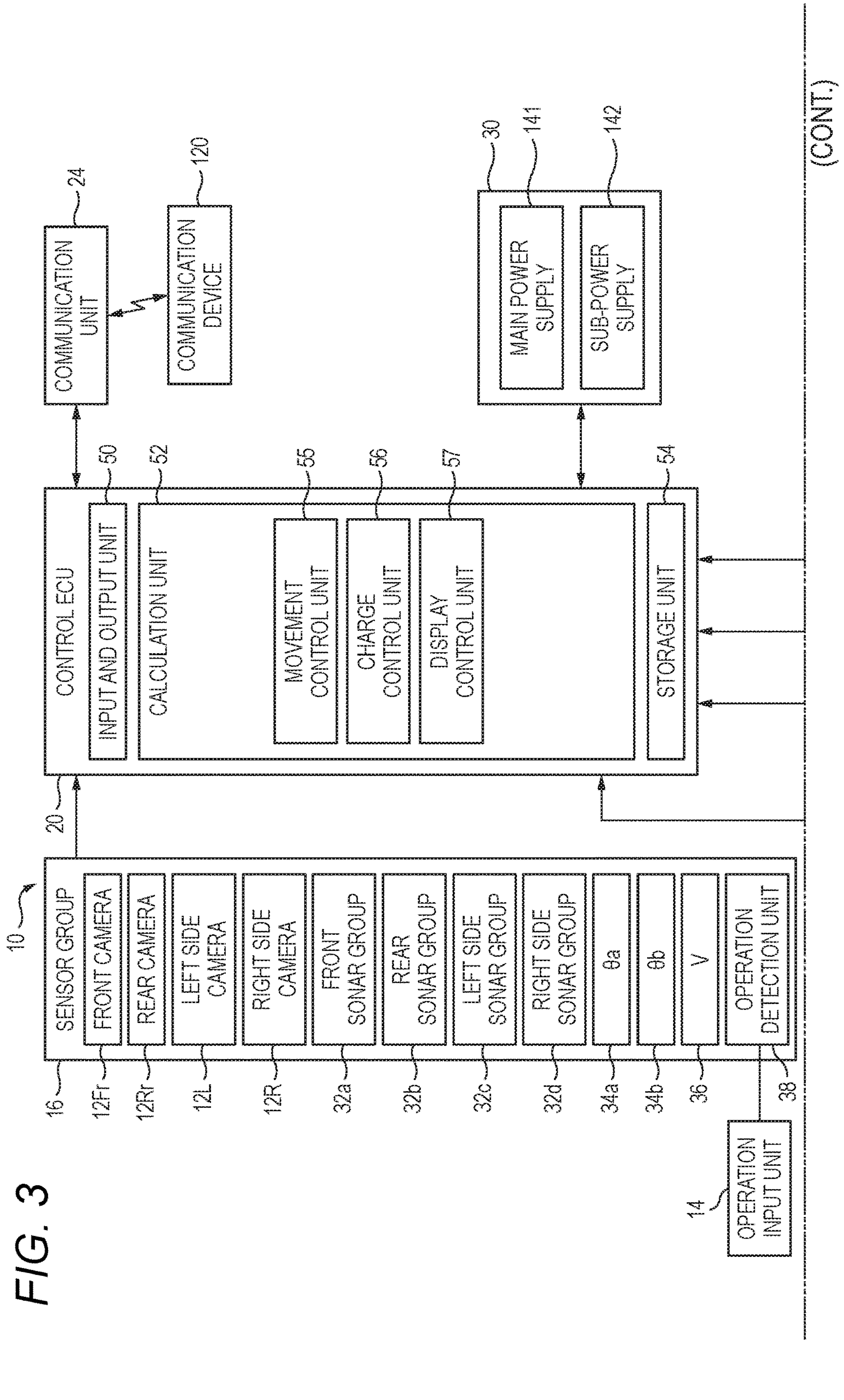
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26, a braking force control system 28, and a power supply 30.

The sensor group 16 acquires various detection values used for control performed by the control ECU 20. The sensor group 16 includes the front camera 12Fr, the rear camera 12Rr, the left side camera 12L, and the right side camera 12R. In addition, the sensor group 16 includes a front sonar group 32*a*, a rear sonar group 32*b*, a left side sonar group 32*c*, and a right side sonar group 32*d*. In addition, the sensor group 16 includes wheel sensors 34*a* and 34*b*, a vehicle speed sensor 36, and an operation detection unit 38. The sensor group 16 may include a radar.

The front camera 12Fr, the rear camera 12Rr, the left side camera 12L, and the right side camera 12R acquire recognition data (for example, surrounding images) for recognizing an outside of the vehicle 10 by capturing images of surroundings of the vehicle 10. Surrounding images captured by the front camera 12Fr, the rear camera 12Rr, the left side camera 12L, and the right side camera 12R are referred to as a front image, a rear image, a left side image, and a right side image, respectively. An image formed by the left side image and the right side image may be referred to as a side image.

The front sonar group 32*a*, the rear sonar group 32*b*, the left side sonar group 32*c*, and the right side sonar group 32*d* emit sound waves to the surroundings of the vehicle 10 and receive reflected sounds from other objects. The front sonar group 32*a* includes, for example, four sonars. The sonars constituting the front sonar group 32*a* are respectively provided on an obliquely left front side, a front left side, a front right side, and an obliquely right front side of the vehicle 10. The rear sonar group 32*b* includes, for example, four sonars. The sonars constituting the rear sonar group 32*b* are respectively provided on an obliquely left rear side, a rear left side, a rear right side, and an obliquely right rear side of the vehicle 10. The left side sonar group 32*c* includes, for example, two sonars. The sonars constituting the left side sonar group 32*c* are provided in a front side and a rear side of a left side portion of the vehicle 10, respectively. The right side sonar group 32*d* includes, for example, two sonars. The sonars constituting the right side sonar group 32*d* are provided in a front side and in a rear side of a right side portion of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses each time the wheels rotate by predetermined angles. The detection pulses output from the wheel sensors 34*a* and 34*b* are used to calculate the rotation angles of the wheels and rotation speeds of the wheels. A traveling distance of the vehicle 10 is calculated based on the rotation angles of the wheels. The wheel sensor 34*a* detects, for example, a rotation angle $\theta a$ of the left rear wheel. The wheel sensor 34*b* detects, for example, a rotation angle $\theta b$ of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects a content of an operation performed by a user using an operation input unit 14, and outputs the detected content of the operation to the control ECU 20. The operation input unit 14 includes, for example, various user interfaces such as a side mirror switch that switches opened and closed states of the side mirrors 11L and 11R, and a shift lever (a select lever or a selector).

The navigation device 18 detects a current position of the vehicle 10 by using, for example, a global positioning system (GPS), and guides the user along a route toward a destination. The navigation device 18 includes a storage device (not shown) in which a map information database is provided.

The navigation device 18 includes a touch panel 42 and a speaker 44. The touch panel 42 functions as an input device and a display device of the control ECU 20. The speaker 44 outputs various types of guide information to the user of the vehicle 10 by voice.

The touch panel 42 is configured such that various commands to the control ECU 20 are input. For example, the user can input a command related to movement assistance of the vehicle 10 via the touch panel 42. The movement assistance includes parking assistance and exit assistance of the vehicle 10. In addition, the touch panel 42 is configured to display various screens related to a control content of the control ECU 20. For example, a screen related to the movement assistance of the vehicle 10 is displayed on the touch panel 42. Specifically, a parking assistance button for requesting the parking assistance of the vehicle 10 and an exit assistance button for requesting the exit assistance are displayed on the touch panel 42. The parking assistance button includes an automatic parking button for requesting parking by automatic steering of the control ECU 20 and a guidance parking button for requesting guidance when parking the vehicle by an operation of the driver. The exit assistance button includes an automatic exit button for requesting exit by the automatic steering of the control ECU 20 and a guidance exit button for requesting guidance when the exit of the vehicle is performed by an operation of the driver. Constituent elements other than the touch panel 42, for example, a smartphone or a tablet terminal may be used as the input device or the display device.

The power supply 30 includes a main power supply 141 and a sub-power supply 142. The main power supply 141 is a power supply (secondary power supply) that supplies electric power to an electronic device installed in the vehicle 10 when the vehicle 10 is normally traveling and when the vehicle 10 is parked or exits. The sub-power supply 142 is a power supply (auxiliary power supply) that supplies electric power to vehicle stability assist (VSA) and electric parking brake (EPB) that decelerate or stop the vehicle 10 when the main power supply 141 fails. The sub-power supply 142 is used to operate fail-safe by operating VSA and EPB. The main power supply 141 is, for example, a lithium ion battery, a nickel-metal hydride battery, or a lead-acid battery. The sub-power supply 142 is, for example, a capacitor (electric double-layer capacitor). The power supply 30 is connected to the control ECU 20. The sub-power supply 142 is a power supply device in the present disclosure.

The control ECU 20 includes an input and output unit 50, a calculation unit 52, and a storage unit 54. The calculation unit 52 is implemented by, for example, a central processing unit (CPU). The calculation unit 52 performs various types of control by controlling each unit based on a program stored in the storage unit 54. In addition, the calculation unit 52 receives and outputs signals from and to each unit connected to the control ECU 20 via the input and output unit 50. The control ECU 20 is an example of the control device in the present disclosure. The calculation unit 52 is an example of the control unit in the present disclosure.

The calculation unit 52 includes a movement control unit 55 that performs movement control on the vehicle 10, a charge control unit 56 that performs charge control on the sub-power supply 142 for movement control, and a display control unit 57 that causes a terminal screen of an information terminal that is portable for a user to display an image.

The movement control unit 55 performs automatic parking assistance and automatic exit assistance of the vehicle 10 by automatic steering in which an operation of a steering wheel 110 is automatically performed under the control of the movement control unit 55. In the automatic parking assistance and the automatic exit assistance, an accelerator pedal (not shown), a brake pedal (not shown), and the operation input unit 14 are automatically operated. The movement control unit 55 performs auxiliary parking assistance and auxiliary exit assistance when the driver operates the accelerator pedal, the brake pedal, and the operation input unit 14 to manually park and manually cause the vehicle 10 to perform exit.

For example, the movement control unit 55 performs the movement control for executing movement of the vehicle 10 based on the recognition data of the outside of the vehicle 10 acquired by the front camera 12Fr, the rear camera 12Rr, the left side camera 12L, and the right side camera 12R, and a parking space designated by the user. The movement control includes parking control for automatically parking the vehicle 10 in a predetermined parking space and exit control for causing the vehicle 10 to automatically exit from the predetermined parking space to a target movement position. The movement control unit 55 executes the parking control and the exit control according to instruction signals input from the outside via the input and output unit 50. The input from the outside includes an input by wireless communication from an information terminal or the like carried by the user of the vehicle 10. The movement control unit 55 transmits information related to the parking control and the exit control to an external information terminal via the input and output unit 50.

The movement control unit 55 registers the predetermined parking space designated by the user in the storage unit 54 as a designated parking space. The movement control unit 55 registers feature points related to the designated parking space in the storage unit 54 based on the recognition data of the outside of the vehicle 10 acquired by the front camera 12Fr, the rear camera 12Rr, the left side camera 12L, and the right side camera 12R. The movement control unit 55 performs the automatic parking control for parking the vehicle 10 in the designated parking space and the automatic exit control for exiting from the designated parking space based on the recognition data of the outside of the vehicle 10 and the feature points of the designated parking space designated by the user.

For example, when the vehicle is to move, the display control unit 57 causes the terminal screen of the information terminal to display a first display image for starting the vehicle 10. The first display image is, for example, an image of "ignition ON button", and text information of "please press the power button".

When the vehicle 10 is started in response to an operation of the user on the first display image, the charge control unit 56 starts the charge control on the sub-power supply 142 for the movement control on the vehicle 10.

When the vehicle 10 is started, the display control unit 57 causes the terminal screen of the information terminal to display a second display image for receiving an action plan of the movement control. The action plan of the movement control includes, for example, designating a direction in which the vehicle 10 is to be moved. The display control unit 57 receives the action plan based on the operation of the user on the second display image.

After the operation of the user on the second display image is completed and the action plan is received, in a case where a progress state of the charge control does not reach a predetermined state, the display control unit 57 causes the terminal screen of the information terminal to display a third display image indicating the progress state. The predetermined state is, for example, a state where the charge control on the sub-power supply 142 is completed or nearly completed.

After the operation of the user on the second display image is completed and the action plan is received, in a case where the progress state of the charge control reaches the predetermined state, the display control unit 57 causes the terminal screen of the information terminal not to display the third display image indicating the progress state, or causes the terminal screen of the information terminal to display the third display image in an inconspicuous manner in comparison to a case where the progress state does not reach the predetermined state. The inconspicuous manner is, for example, a display in a light color (the same color as background) that is almost unrecognizable, or a display in a small size that is almost unrecognizable.

The progress state includes at least any one of a progress rate of the charge control, a time until the charge control is completed, a charge amount of the sub-power supply 142, and a charge rate of the sub-power supply 142. The third display image includes an image showing the time until the charge control is completed. The third display image may be, for example, a progress bar that indicates the progress state. The third display image may be, for example, an image such as “Charging. Please wait”. The progress bar may indicate, for example, a current progress state with a progress state at a start time of the charge control on the sub-power supply 142 as a starting point. The progress bar may indicate, for example, a current progress state with a progress state at a start time of the display of the third display image as a starting point.

The progress state is a ratio of a current elapsed time to a time required for the charge control on the sub-power supply 142. For example, if the time required for the charge control (the time until the charge is completed) is 10 seconds, extension of the progress bar indicating the progress state is displayed so as to extend (progress) at a constant speed during the 10 seconds. The time required for the charge control may be fixed at 20 seconds, for example, or may be predicted in consideration of a remaining charge, an environmental temperature, and a degree of deterioration. Regarding the starting point of the progress bar, the progress state at the start time of the charge control as described above may be set as the starting point, or the progress state at the start time of displaying the third display image may be set as the starting point.

The movement control unit 55 restricts the movement control on the vehicle 10 if at least any one of the sub-power supply 142 and the charge control on the sub-power supply 142 is abnormal. For example, in a case where the charge control on the sub-power supply 142 takes 20 seconds or more, or in a case where the sub-power supply 142 is not charged to 80% or more, it is determined that the battery is deteriorated, and the movement control on the vehicle 10 is restricted. The restriction on the movement control includes, for example, not allowing the vehicle 10 to be remotely parked anyway, shortening a travelable distance and a travelable range of the vehicle 10 in the remote parking, and slowing down a movement speed of the vehicle 10 in the remote parking. In a case where a battery of the sub-power supply 142 completely fails, the ignition may be turned off and the user may be notified of this matter. Even if the battery of the sub-power supply 142 completely fails, the movement control may be performed under allowance of the user.

After the charge control on the sub-power supply 142 is completed, the display control unit 57 causes the terminal screen of the information terminal to display a fourth display image for receiving a movement control instruction of the vehicle 10.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects a torque TQ applied to the steering wheel 110.

The EPS motor 104 applies a driving force or a reaction force to a steering column 112 connected to the steering wheel 110, thereby enabling an operation assistance of the steering wheel 110 performed by an occupant and enabling automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. Another communication device 120 is a base station, a communication device of another vehicle, or an information terminal such as a smartphone or a tablet terminal that is portable for a user of the vehicle 10. For example, the communication unit 24 has an Ultra Wide Band (UWB) interface for performing UWB communication with an information terminal. The information terminal will be described later.

The driving force control system 26 includes a driving ECU 130. The driving force control system 26 executes driving force control on the vehicle 10. The driving ECU 130 controls a driving force of the vehicle 10 by controlling an engine (not shown) or the like based on an operation performed by the user on the accelerator pedal (not shown).

The braking force control system 28 includes a braking ECU 132. The braking force control system 28 executes braking force control on the vehicle 10. The braking ECU 132 controls a braking force of the vehicle 10 by controlling a brake mechanism (not shown) or the like based on an operation performed by the user on the brake pedal (not shown).

<Hardware Configuration of Information Terminal>

Figure 4:
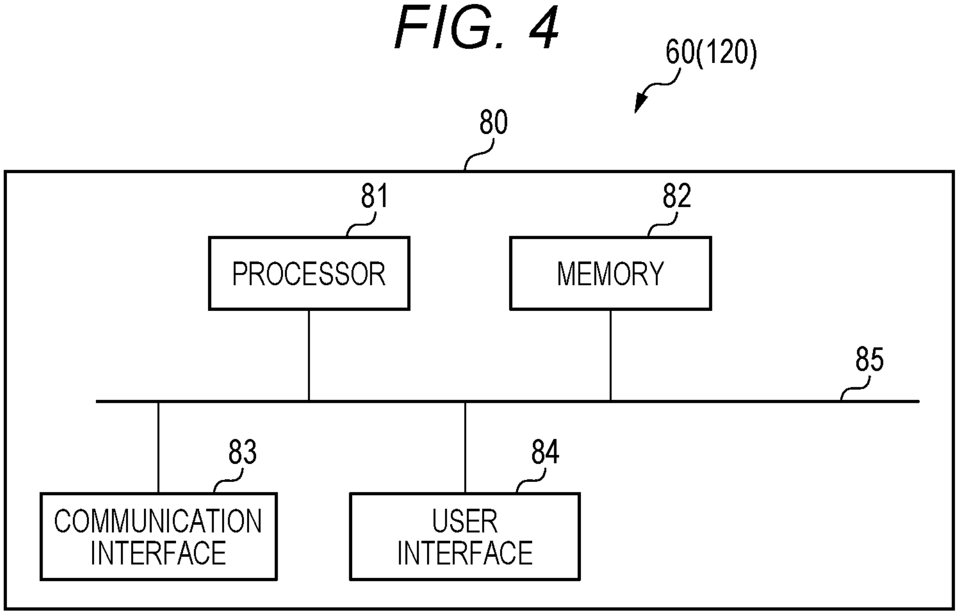
FIG. 4 is a diagram showing an example of a hardware configuration of an information terminal.

FIG. 4 is a diagram showing an example of a hardware configuration of an information terminal 60. Hardware of the information terminal 60 may be implemented by, for example, an information processing device 80 shown in FIG. 4. The information processing device 80 includes a processor 81, a memory 82, a communication interface 83, and a user interface 84. The processor 81, the memory 82, the communication interface 83, and the user interface 84 are connected by, for example, a bus 85.

The processor 81 is a circuit that performs signal processing, and is, for example, a central processing unit (CPU) that controls the entire information processing device 80. The processor 81 is an example of a control unit in the present disclosure. The processor 81 may be implemented by another digital circuit such as a field programmable gate array (FPGA) or a digital signal processor (DSP). In addition, the processor 81 may be implemented by combining a plurality of digital circuits.

The memory 82 includes, for example, a main memory and an auxiliary memory. The main memory is, for example, a random access memory (RAM). The main memory is used as a work area of the processor 81.

The auxiliary memory is, for example, a nonvolatile memory such as a magnetic disk, an optical disk, or a flash memory. Various programs for causing the information processing device 80 to operate are stored in the auxiliary memory. The programs stored in the auxiliary memory are loaded onto the main memory and executed by the processor 81.

In addition, the auxiliary memory may include a portable memory removable from the information processing device 80. Examples of the portable memory include a universal serial bus (USB) flash drive, a memory card such as a secure digital (SD) memory card, and an external hard disk drive.

The communication interface 83 is a communication interface that performs the wireless communication with an outside of the information processing device 80 (for example, the communication unit 24 of the vehicle 10). For example, the communication interface 83 has a UWB interface for UWB communication with the vehicle 10. The communication interface 83 is controlled by the processor 81.

The user interface 84 includes, for example, an input device that receives an operation input from the user and an output device that outputs information to the user. The input device may be implemented by, for example, a touch panel. The output device may be implemented by, for example, a display and a speaker. The user interface 84 is controlled by the processor 81.

The processor 81 performs the movement control for giving an instruction to move the vehicle 10. For example, the processor 81 performs the movement control on the vehicle 10 based on a specific operation of the user on the terminal screen of the information terminal 60. The movement control includes, for example, the parking control for automatically parking the vehicle 10 in a predetermined parking space and the exit control for causing the vehicle 10 to automatically exit from the predetermined parking space to a target movement position. The specific operation includes, for example, a slide operation for moving the vehicle 10, and a tap operation for reserving parking and exit plans. The slide operation includes a continuous position instruction operation (for example, swiping operation), a rotation instruction operation in a predetermined rotation direction (for example, rotation swiping operation), and the like. Further, the processor 81 performs control of generating a guidance image for prompting the user M to perform the instruction operation on the terminal screen of the information terminal 60 and causing the terminal screen to display the generated guidance image.

Specifically, the processor 81 causes the terminal screen of the information terminal 60 to display the first display image for starting the vehicle 10. Based on the operation by the user on the first display image, the processor 81 causes the control ECU 20 of the vehicle 10 to start the vehicle 10 and start the charge control on the sub-power supply 142.

When the vehicle 10 is started, the processor 81 causes the terminal screen of the information terminal 60 to display the second display image for receiving the action plan of the movement control on the vehicle 10. The processor 81 receives the action plan of the movement control on the vehicle 10 based on the operation by the user on the second display image.

In response to receiving the action plan, the processor 81 causes the terminal screen of the information terminal 60 to display the third display image indicating the progress state when the progress state of the charge control on the vehicle 10 does not reach a predetermined state. In response to receiving the action plan, in a case where the progress state of the charge control on the vehicle 10 reaches the predetermined state, the processor 81 causes the terminal screen of the information terminal 60 not to display the third display image indicating the progress state, or causes the terminal screen of the information terminal 60 to display the third display image in an inconspicuous manner in comparison to a case where the progress state does not reach the predetermined state.

The processor 81 transmits to the vehicle 10 a parking instruction for automatically parking the vehicle 10 and an exit instruction for causing the vehicle 10 to automatically exit based on the specific operation on the terminal screen of the information terminal 60. An application capable of controlling the movement of the vehicle 10 by transmitting and receiving information related to the movement control on the vehicle 10 to and from the vehicle 10 is installed in the information terminal 60.

<Example of Movement Control Performed by Information Terminal 60>

Figure 5:
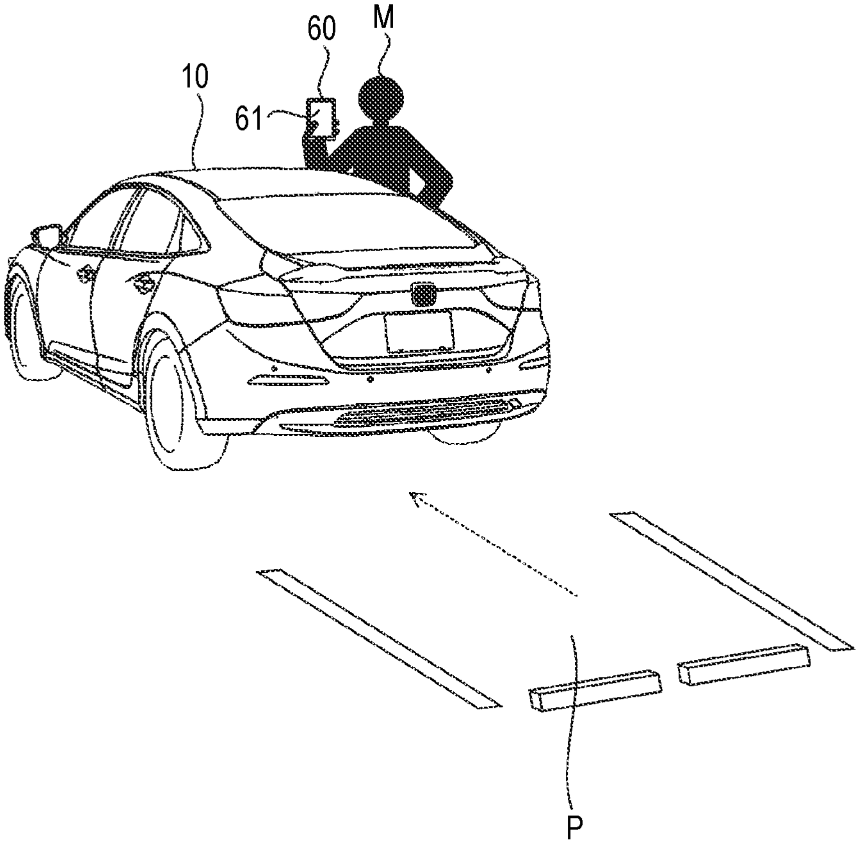
FIG. 5 is a diagram showing how exit of the vehicle is controlled using the information terminal from an outside of the vehicle.

FIG. 5 is a diagram showing an example of how a user M of the vehicle 10 performs the exit control for causing the vehicle 10 to automatically exit from a parking space P using the information terminal 60 carried by the user M outside the vehicle 10.

When a terminal screen 61 implemented as a touch panel is touched by the user M, the information terminal 60 transmits to the vehicle 10 an exit instruction to give an instruction of automatic exit of the vehicle 10 by the wireless communication. The vehicle 10 receives the exit instruction from the information terminal 60, and according to the received exit instruction, wirelessly communicates with the information terminal 60 and performs the exit control for causing the vehicle 10 to automatically exit to a target movement position. The shown example shows a state where the vehicle 10 exits to a position where the user M may easily access a front right door which is a driving seat of the vehicle 10. For example, Ultra Wide Band (UWB: registered trademark), Bluetooth Low Energy (BLE: registered trademark), and Near Field Communication (NFC: registered trademark) are used as wireless communication between the information terminal 60 and the vehicle 10.

<Movement Control on Vehicle 10 Led by Calculation Unit 52>

Next, an example of the exit control on the vehicle 10 led by the calculation unit 52 of the vehicle 10 will be described with reference to FIGS. 6 to 17.

Figure 6:
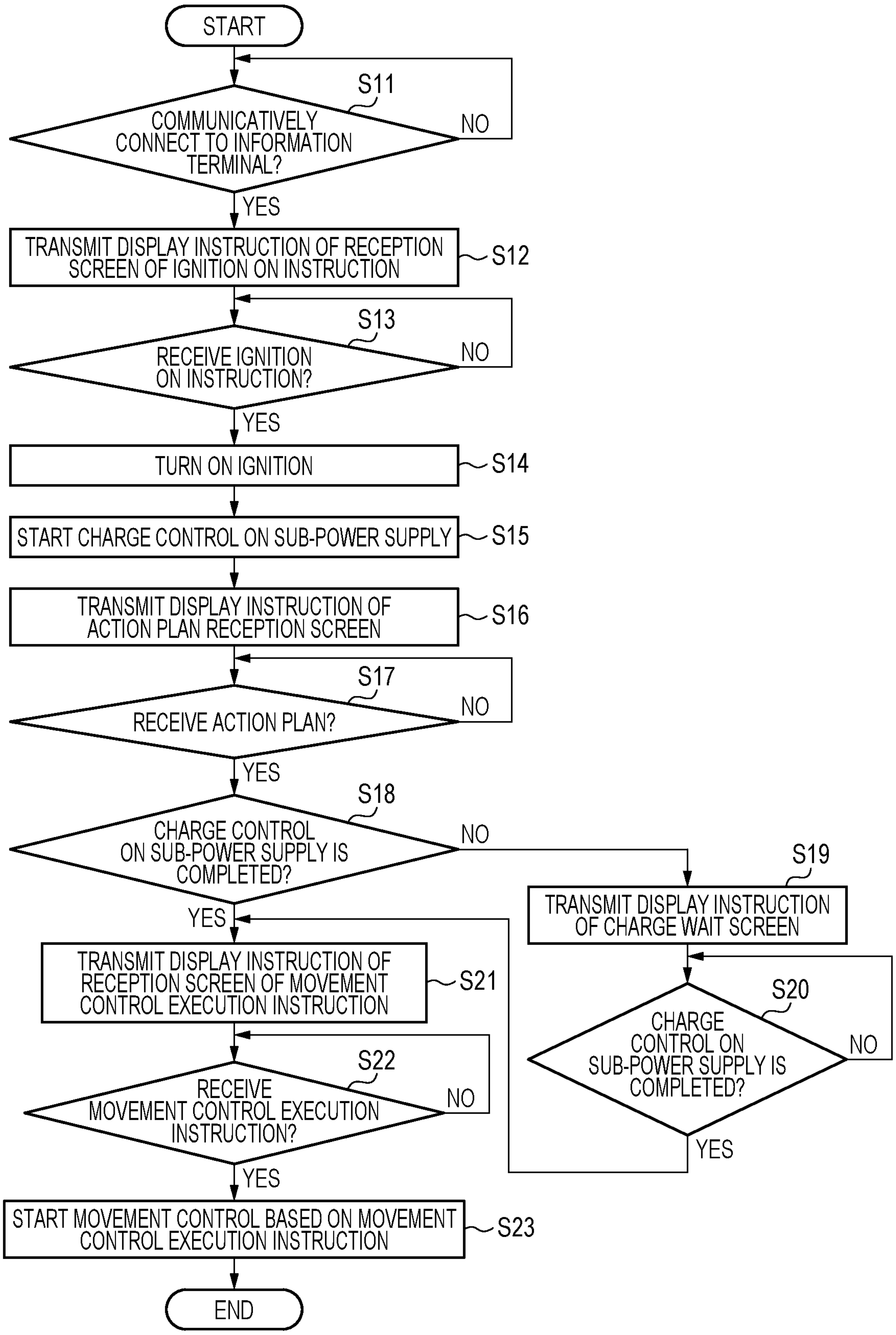
FIG. 6 is a flowchart of an exit control by a calculation unit when the vehicle performs automatic exit.

FIG. 6 is a flowchart showing the exit control of the calculation unit 52 when the vehicle 10 performs the automatic exit.

For example, the vehicle 10 is parked in a parking lot. The user M is at a place a little away from the vehicle 10 and is about to cause the vehicle 10 to automatically exit from the parking lot. The user M carries the information terminal 60.

The calculation unit 52 mounted on the control ECU 20 of the vehicle 10 determines whether the vehicle 10 is connected to the information terminal 60 by the wireless communication (step S11). The communication connection is enabled by transmitting a connection request from the information terminal 60 to the vehicle 10.

Figure 11:
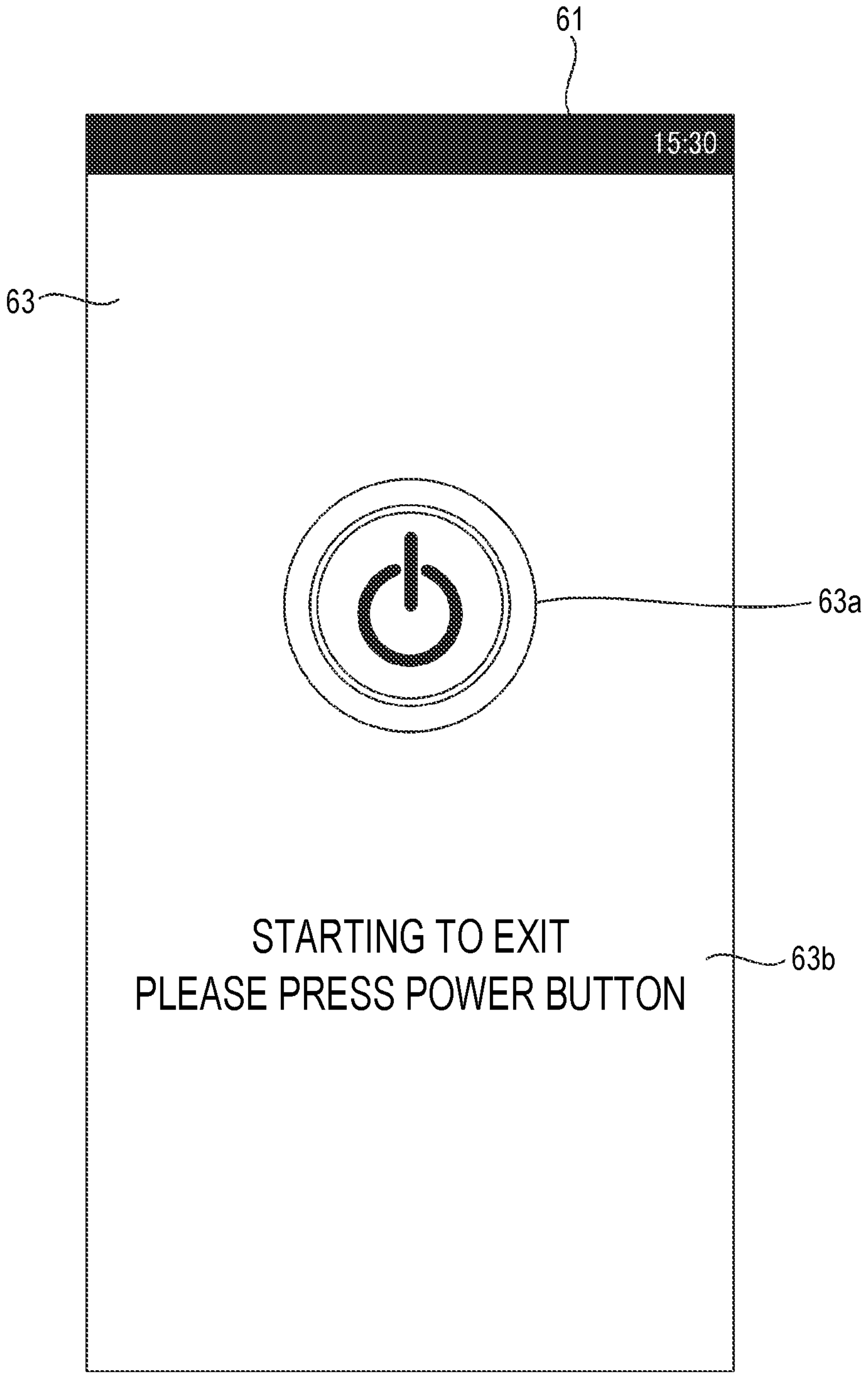
FIG. 11 is a reception screen displayed on the information terminal when reception of an ignition ON instruction is started.

In step S11, in a case where the communication connection with the information terminal 60 is not established (step S11: No), the calculation unit 52 repeats the process of step S11 until the communication connection is established. In step S11, in a case where the communication connection with the information terminal 60 is established (step S11: Yes), in order to cause the terminal screen 61 of the information terminal 60 to display a reception screen of an ignition ON instruction for turning on an ignition of the vehicle 10, the calculation unit 52 transmits a display instruction to the information terminal 60 (step S12). The reception screen of the ignition ON instruction is an example of the first display image in the present disclosure. An example of the reception screen of the ignition ON instruction is shown in FIG. 11.

Next, the calculation unit 52 determines whether the ignition ON instruction for turning on the ignition of the vehicle 10 is received from the information terminal 60 (step S13).

In step S13, in a case where the ignition ON instruction is not received (step S13: No), the calculation unit 52 repeats the process of step S13 until the ignition ON instruction is received. In step S13, in a case where the ignition ON instruction is received (step S13: Yes), the calculation unit 52 turns on the ignition of the vehicle 10 (step S14).

Next, the calculation unit 52 starts the charge control for charging the battery of the sub-power supply 142 of the vehicle 10 (step S15).

Figure 14:
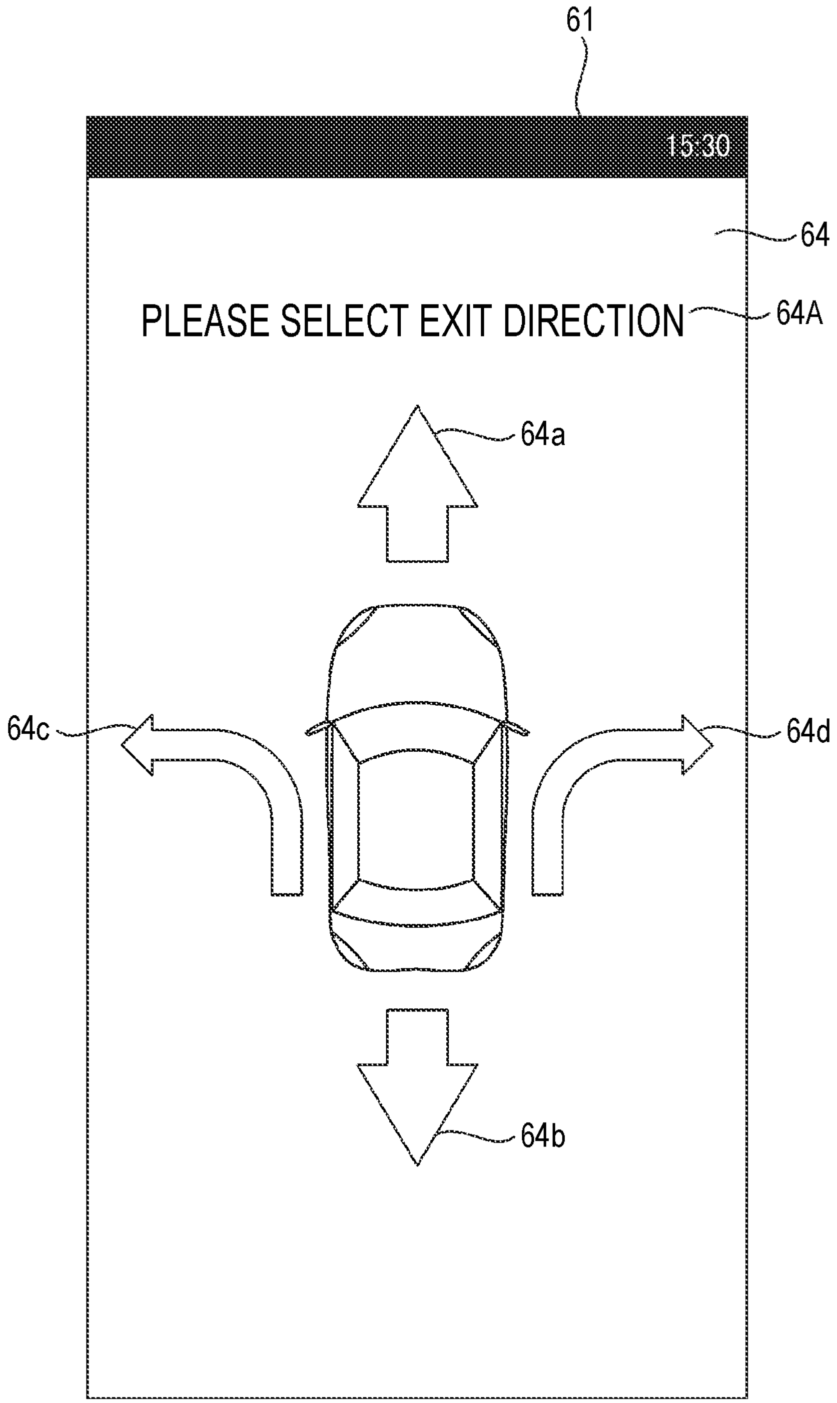
FIG. 14 is a reception screen displayed on the information terminal for receiving an action plan of the vehicle.

Next, in order to cause the terminal screen 61 of the information terminal 60 to display an action plan reception screen for allowing the user M to perform an input operation of the action plan of the vehicle 10, the calculation unit 52 transmits a display instruction to the information terminal 60 (step S16). The action plan reception screen is an example of the second display image in the present disclosure. An example of the action plan reception screen is shown in FIG. 14.

Next, the calculation unit 52 determines whether the action plan of the vehicle 10 is received from the information terminal 60 that transmits the display instruction in step S16 (step S17).

In step S17, in a case where the action plan is not received (step S17: No), the calculation unit 52 repeats the process of step S17 until the action plan is received. In step S17, in a case where the action plan is received (step S17: Yes), the calculation unit 52 determines whether the charge control on the sub-power supply 142 started in step S15 is completed (step S18).

Figure 16:
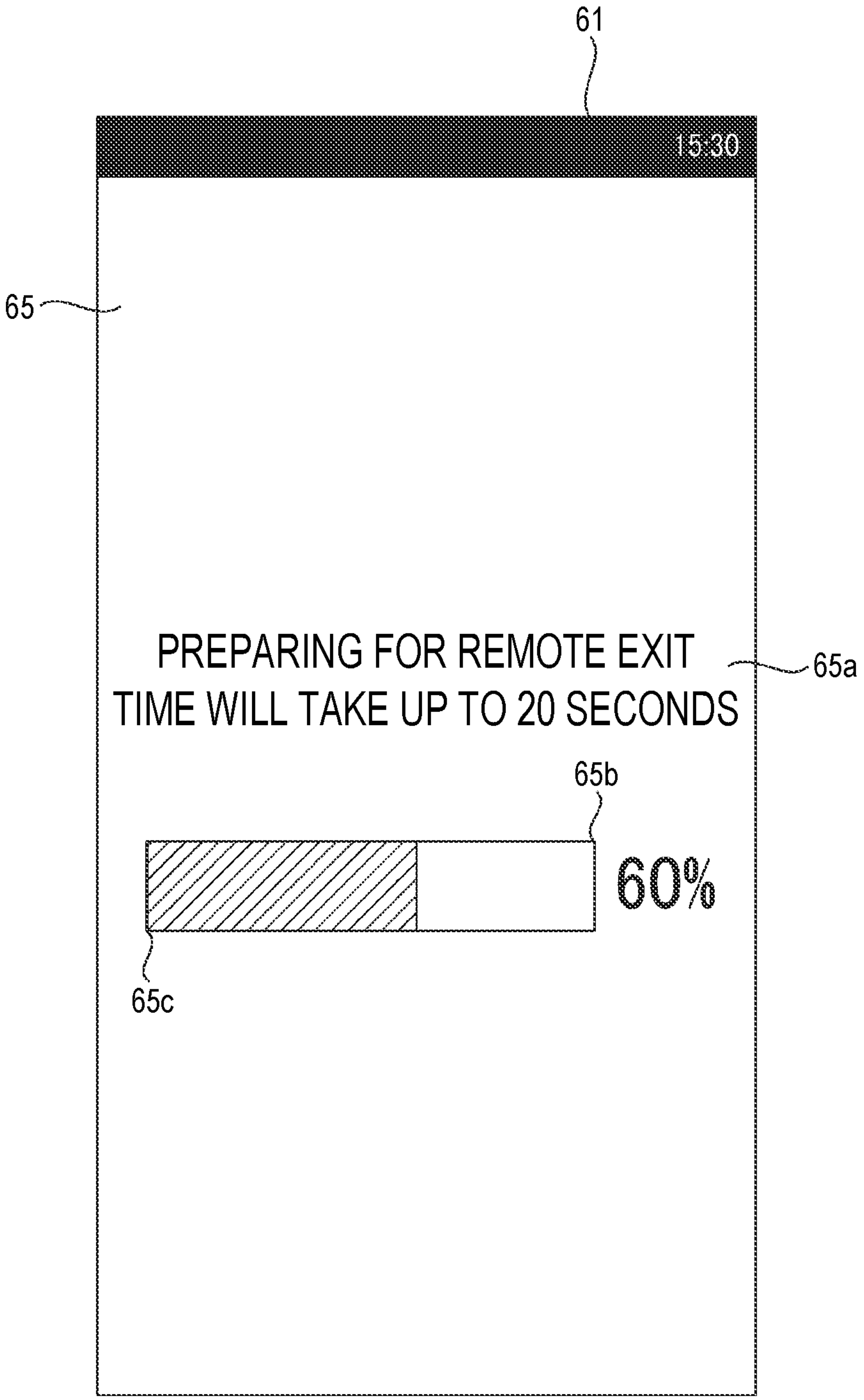
FIG. 16 is a charge wait screen displayed on the information terminal when waiting for charging a sub-power supply.

In step S18, in a case where the charge control on the sub-power supply 142 is not completed (step S18: No), in order to cause the terminal screen 61 of the information terminal 60 to display a charge wait screen for making the user M wait for charge complete of the sub-power supply 142, the calculation unit 52 transmits a display instruction to the information terminal 60 (step S19). The charge wait screen is an example of the third display image in the present disclosure. An example of the charge wait screen is shown in FIG. 16.

Next, the calculation unit 52 determines whether the charge control on the sub-power supply 142 is completed (step S20).

Figure 17:
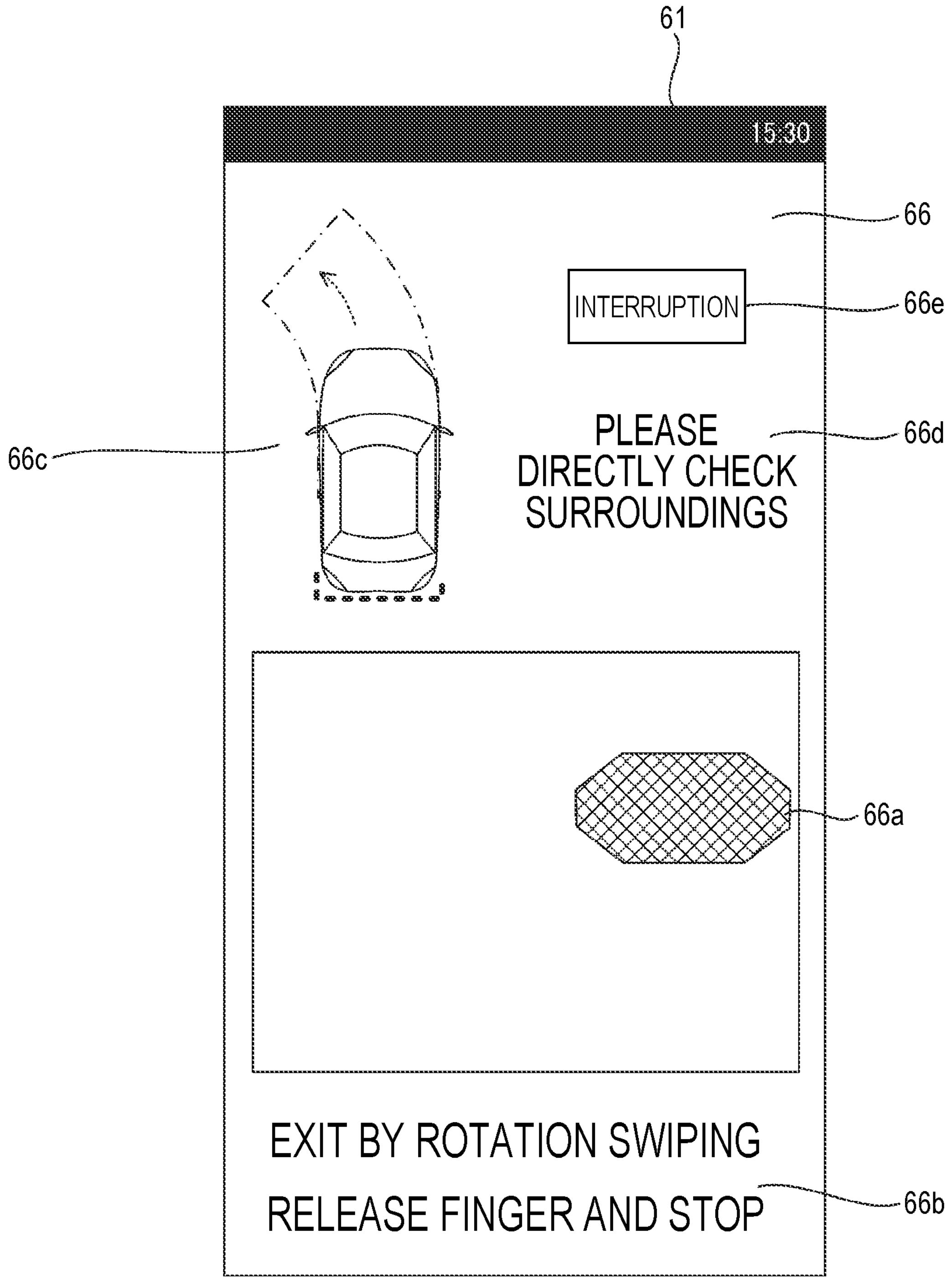
FIG. 17 is a reception screen displayed on the information terminal for receiving a movement control execution instruction by a user.

In step S20, in a case where the charge control on the sub-power supply 142 is not completed (step S20: No), the calculation unit 52 repeats the process of step S20 until the charge control is completed. In step S20, in a case where the charge control on the sub-power supply 142 is completed (step S20: Yes), in order to cause the terminal screen 61 of the information terminal 60 to display a reception screen of a movement control execution instruction for allowing the user M to give an instruction to execute the movement control on the vehicle 10, the calculation unit 52 transmits a display instruction to the information terminal 60 (step S21). The reception screen of the movement control execution instruction is an example of the fourth display image in the present disclosure. An example of the reception screen of the movement control execution instruction is shown in FIG. 17.

On the other hand, in a case where it is determined in step S18 that the charge control on the sub-power supply 142 is completed (step S18: Yes), the calculation unit 52 also proceeds to step S21, and transmits the display instruction of the reception screen of the movement control execution instruction to the information terminal 60 (step S21).

Next, the calculation unit 52 determines whether the movement control execution instruction is received from the information terminal 60 that transmits the display instruction in step S21 (step S22).

In step S22, in a case where the movement control execution instruction is not received (step S22: No), the calculation unit 52 repeats the process of step S22 until the movement control execution instruction is received. In step S22, in a case where the movement control execution instruction is received (step S22: Yes), the calculation unit 52 starts the movement control on the vehicle 10 based on the movement control execution instruction (step S23).

Figure 7:
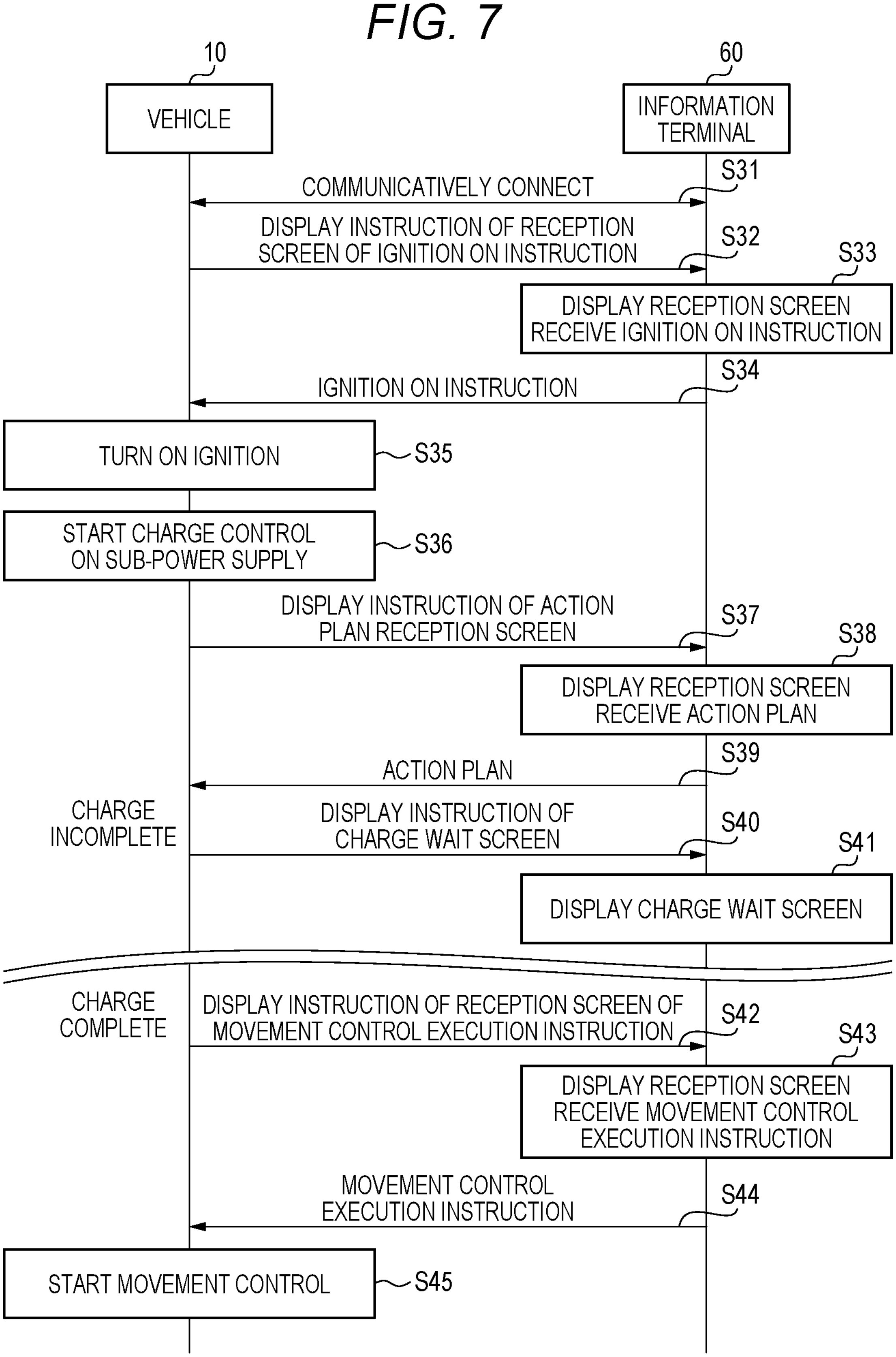
FIG. 7 is a sequence diagram showing an example of operations of the vehicle and the information terminal when the vehicle performs the automatic exit.

FIG. 7 is a sequence diagram showing an example of operations of the vehicle 10 and the information terminal 60 when the vehicle 10 performs the automatic exit.

A situation when the vehicle 10 performs the automatic exit is the same as the situation described with reference to FIG. 6, and the vehicle 10 is parked in the parking lot. The user M is at a place a little away from the vehicle 10 and is about to cause the vehicle 10 to automatically exit from the parking lot. The user M carries the information terminal 60.

The information terminal 60 activates an automatic exit application, and transmits a communication connection request to the vehicle 10. The vehicle 10 receives the communication connection request from the information terminal 60, so that the vehicle 10 and the information terminal 60 are connected and become communicable with each other (step S31).

Next, in order to cause the terminal screen 61 of the information terminal 60 to display the reception screen of the ignition ON instruction for the operation to turn on the ignition of the vehicle 10, the vehicle 10 transmits the display instruction to the information terminal 60 (step S32).

Figure 12:
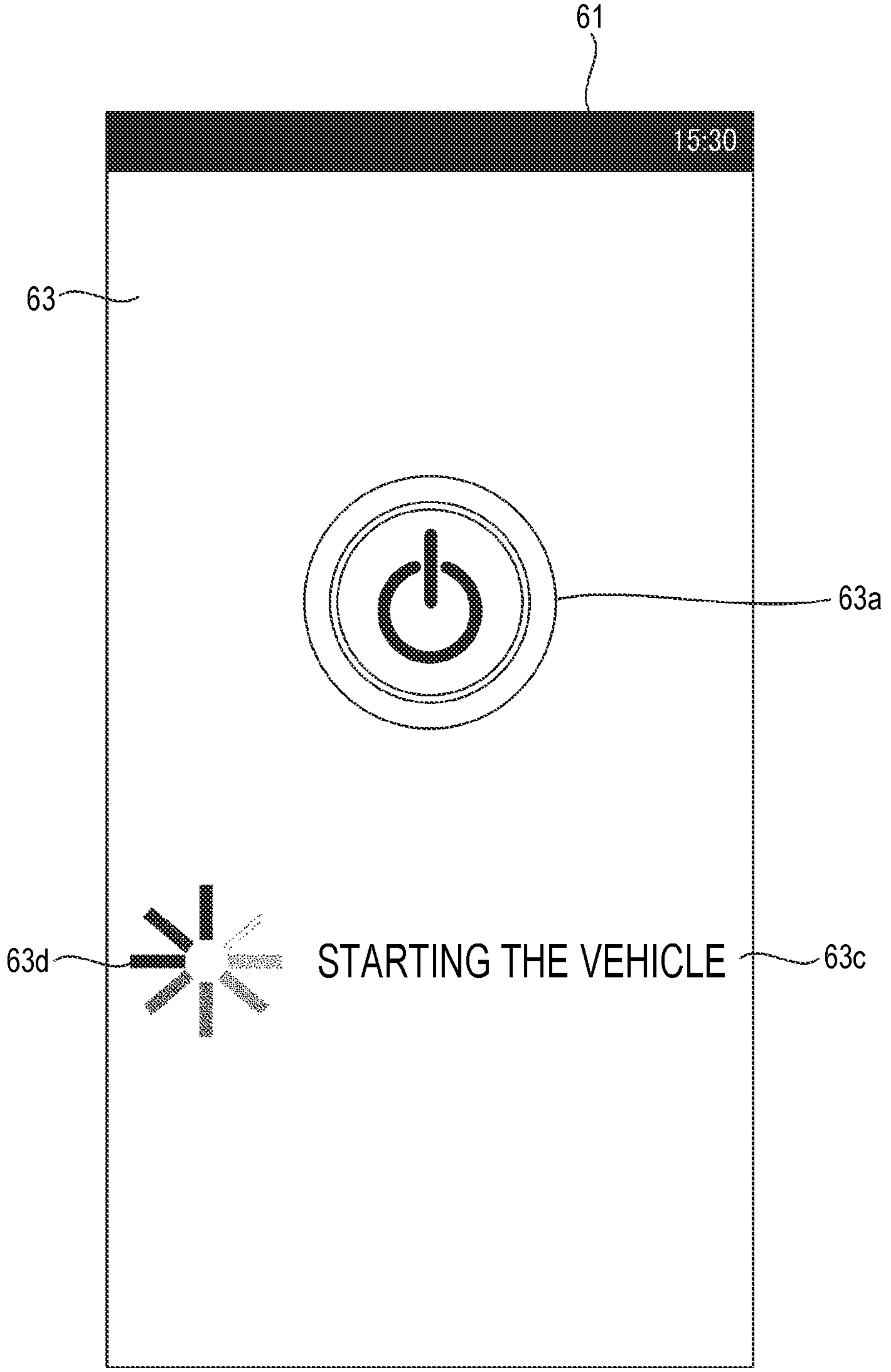
FIG. 12 is a reception screen displayed on the information terminal when an ignition ON button is pressed.
Figure 13:
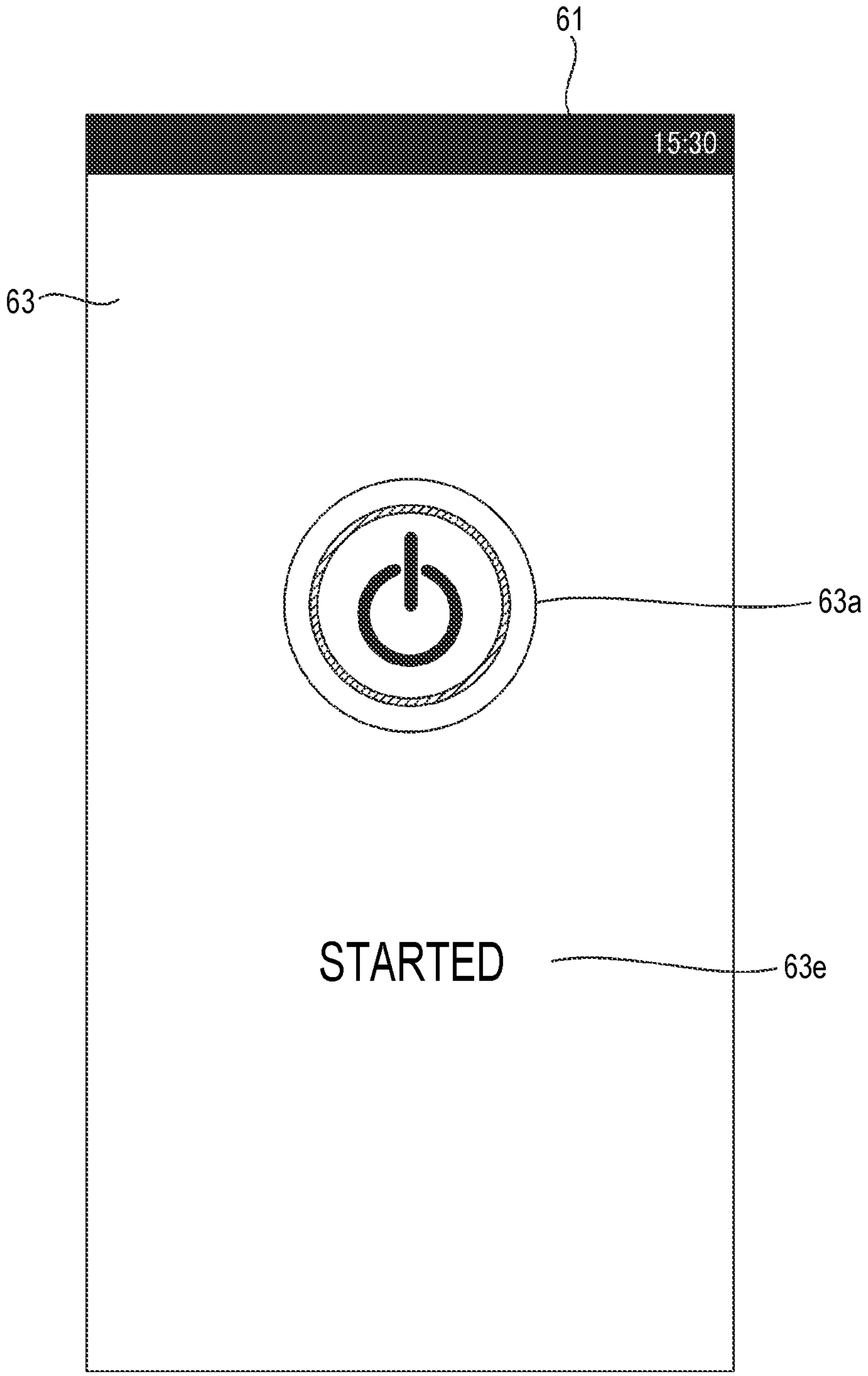
FIG. 13 is a reception screen displayed on the information terminal when the ignition ON button is pressed.

Next, the information terminal 60 displays on the terminal screen 61 the reception screen of the ignition ON instruction according to the display instruction received from the vehicle 10 in step S32, and receives the ignition ON instruction from the user M on the reception screen (step S33). An example of the reception screen of the ignition ON instruction is shown in FIGS. 11 to 13.

Next, in response to receiving the ON instruction from the user M in step S33, the information terminal 60 transmits the ignition ON instruction for turning on the ignition to the vehicle 10 (step S34).

Next, in response to the ignition ON instruction being received by the vehicle 10 from the information terminal 60 in step S34, the ignition of the vehicle 10 is turned ON (step S35).

Next, the vehicle 10 starts the charge control for charging the battery of the sub-power supply 142 of the vehicle 10 (step S36).

Next, in order to cause the terminal screen 61 of the information terminal 60 to display the action plan reception screen for allowing the user M to input and operate the action plan of the vehicle 10, the vehicle 10 transmits the display instruction to the information terminal 60 (step S37).

Figure 15:
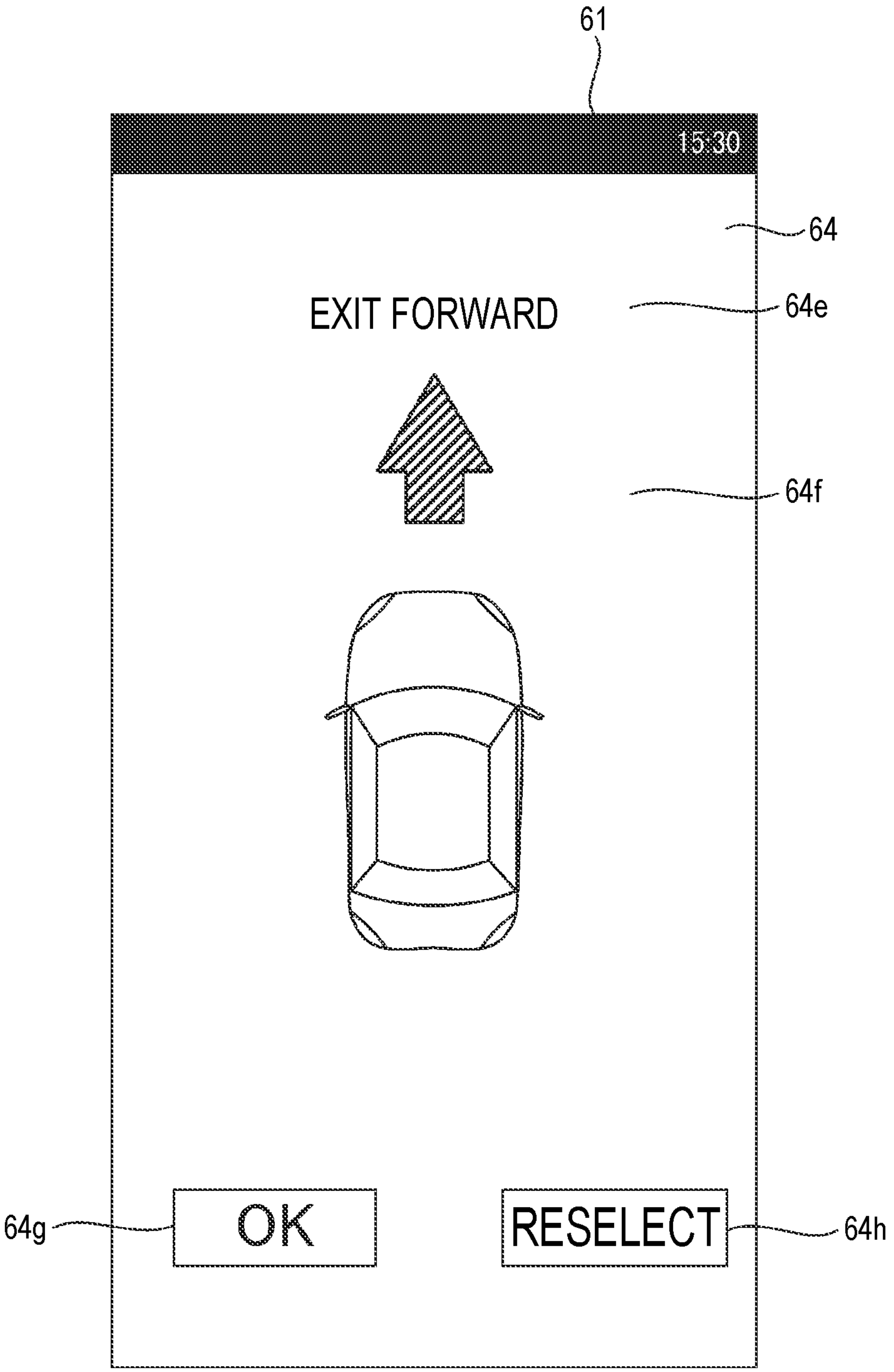
FIG. 15 is a reception screen displayed on the information terminal for receiving an action plan of the vehicle.

Next, the information terminal 60 displays on the terminal screen 61 the action plan reception screen according to the display instruction received from the vehicle 10 in step S37, and receives an action plan instruction from the user M on the reception screen (step S38). An example of the action plan reception screen is shown in FIG. 14, and an example of a screen with which the action plan instruction has been received is shown in FIG. 15.

Next, in response to receiving the action plan instruction from the user M in step S38, the information terminal 60 transmits the action plan to the vehicle 10 (step S39).

Next, in response to receiving the action plan from the information terminal 60 in step S39, the vehicle 10 determines whether the charge control on the sub-power supply 142 started in step S36 is completed. In a case where the charge of the sub-power supply 142 is not yet completed, in order to cause the terminal screen 61 of the information terminal 60 to display the charge wait screen for having the user M wait for charging, the display instruction is transmitted to the information terminal 60 (step S40).

Next, the information terminal 60 displays the charge wait screen on the terminal screen 61 according to the display instruction received from the vehicle 10 in step S40 (step S41). An example of the charge wait screen is shown in FIG. 16.

Next, after waiting for charging for a predetermined period, in a case where the charge of the sub-power supply 142 started in step S36 is completed, in order to cause the terminal screen 61 of the information terminal 60 to display the reception screen of the movement control execution instruction for executing the movement control on the vehicle 10, the vehicle 10 transmits the display instruction to the information terminal 60 (step S42).

Next, the information terminal 60 displays on the terminal screen 61 the reception screen of the movement control execution instruction according to the display instruction received from the vehicle 10 in step S42, and receives the movement control execution instruction from the user M on the reception screen (step S43). An example of the reception screen of the movement control execution instruction is shown in FIG. 17.

Next, in response to receiving the movement control execution instruction from the user M in step S43, the information terminal 60 transmits the movement control execution instruction for executing the movement control to the vehicle 10 (step S44).

Next, the vehicle 10 starts the movement control for causing the vehicle 10 to automatically exit from the parking lot (step S45).

As described above, the control device (control ECU 20) of vehicle 10 starts the charge control on the sub-power supply 142 when vehicle 10 is started in response to the ignition ON instruction based on the operation of the user M on the information terminal 60. Then, the charge control on the sub-power supply 142 is executed even while the input operation of the action plan related to the automatic exit of the vehicle 10 is received from the user M, and in response to receiving the action plan from the user M, the terminal screen 61 of the information terminal 60 is caused to display the charge wait screen (third display image) indicating the progress state of the charge control. Therefore, the charge wait screen is not displayed on the information terminal 60 while the user M is performing the input operation of the action plan related to the automatic exit of the vehicle 10, and thus, it may be possible to make the user M feel that the time to wait for the charge control on the sub-power supply 142 is short.

Figure 8:
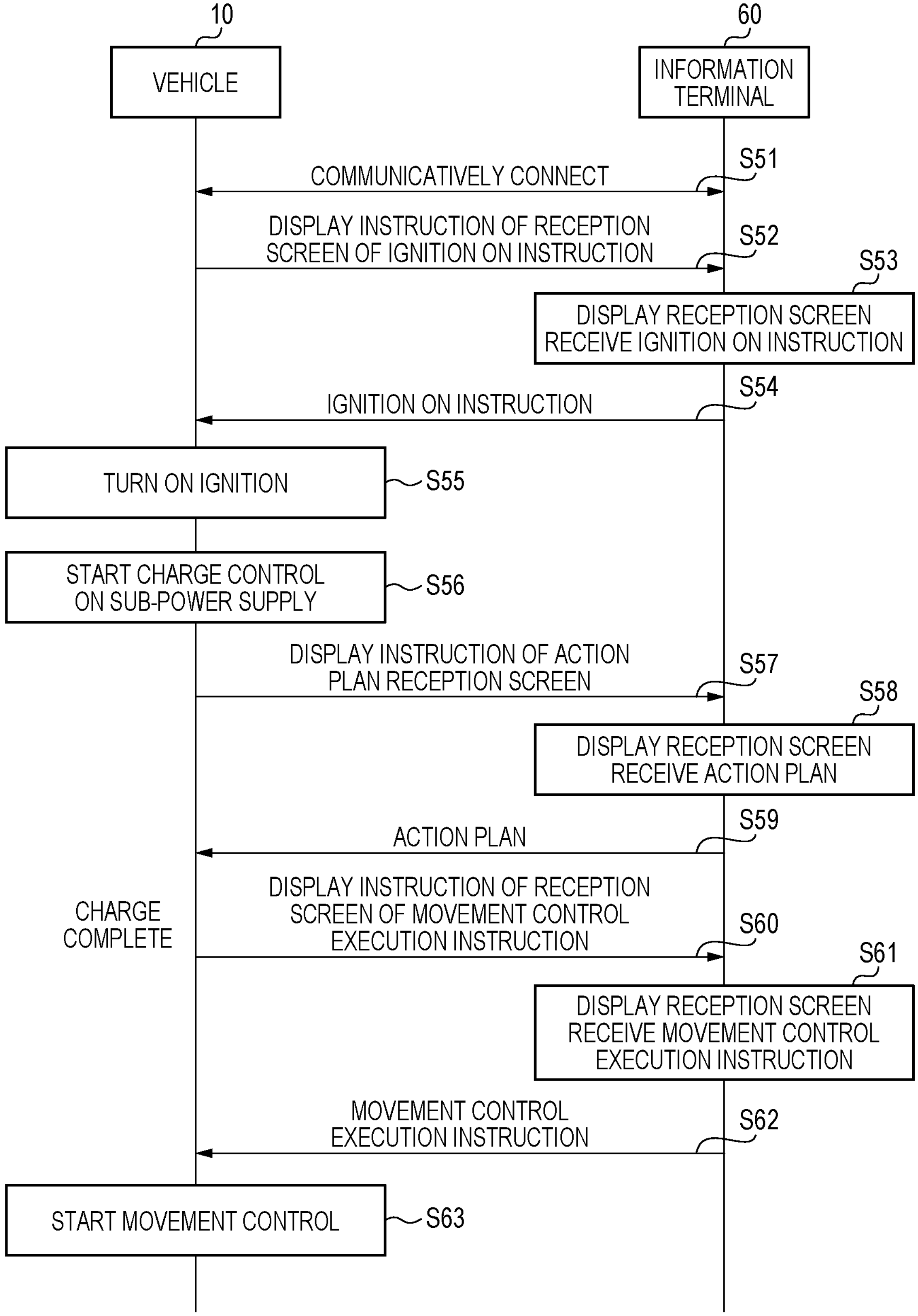
FIG. 8 is a sequence diagram showing another example of the operations of the vehicle and the information terminal when the vehicle performs the automatic exit.

FIG. 8 is a sequence diagram showing another example of the operations of the vehicle 10 and the information terminal 60 when the vehicle 10 performs the automatic exit. In the operation example described in FIG. 7, the charge of the sub-power supply 142 is not yet completed when the action plan is transmitted from the information terminal 60 to the vehicle 10, whereas an operation example of FIG. 8 differs from the operation example of FIG. 7 in that the charge of the sub-power supply 142 is completed when the action plan is transmitted.

As shown in FIG. 8, in this operation example, processes from step S51 to step S59 are the same as the processes from step S31 to step S39 in the operation example described with reference to FIG. 7. Therefore, descriptions of steps S51 to S59 are omitted.

Next, in response to receiving the action plan from the information terminal 60 in step S59, the vehicle 10 determines whether the charge control on the sub-power supply 142 started in step S56 is completed. In a case where the charge of the sub-power supply 142 is completed, in order to cause the terminal screen 61 of the information terminal 60 to display the reception screen of the movement control execution instruction for executing the movement control on the vehicle 10, the display instruction is transmitted to the information terminal 60 (step S60). That is, if the charge of the sub-power supply 142 is completed when the vehicle 10 receives the action plan from the information terminal 60, the vehicle 10 does not cause the terminal screen 61 of the information terminal 60 to display the charge wait screen for waiting for charge.

The processes from step S61 to step S63 are the same as the processes from step S43 to step S45 described in FIG. 7. Therefore, the descriptions of steps S61 to S63 are omitted.

As described above, in response to receiving the action plan related to the automatic exit of the vehicle 10 from the user M, in a case where the progress state of the charge control on the sub-power supply 142 reaches a state where the charge is completed, the control device (control ECU 20) of the vehicle 10 in the present operation example causes the information terminal 60 not to display the progress state, that is, causes the terminal screen 61 not to display the charge wait screen (third display image). Therefore, it is possible to reduce the annoyance of the user M that the charge wait screen is displayed on the terminal screen 61.

FIGS. 9 to 17 are diagrams showing examples of screens displayed on the information terminal 60 when the vehicle 10 performs the automatic exit.

Figure 9:
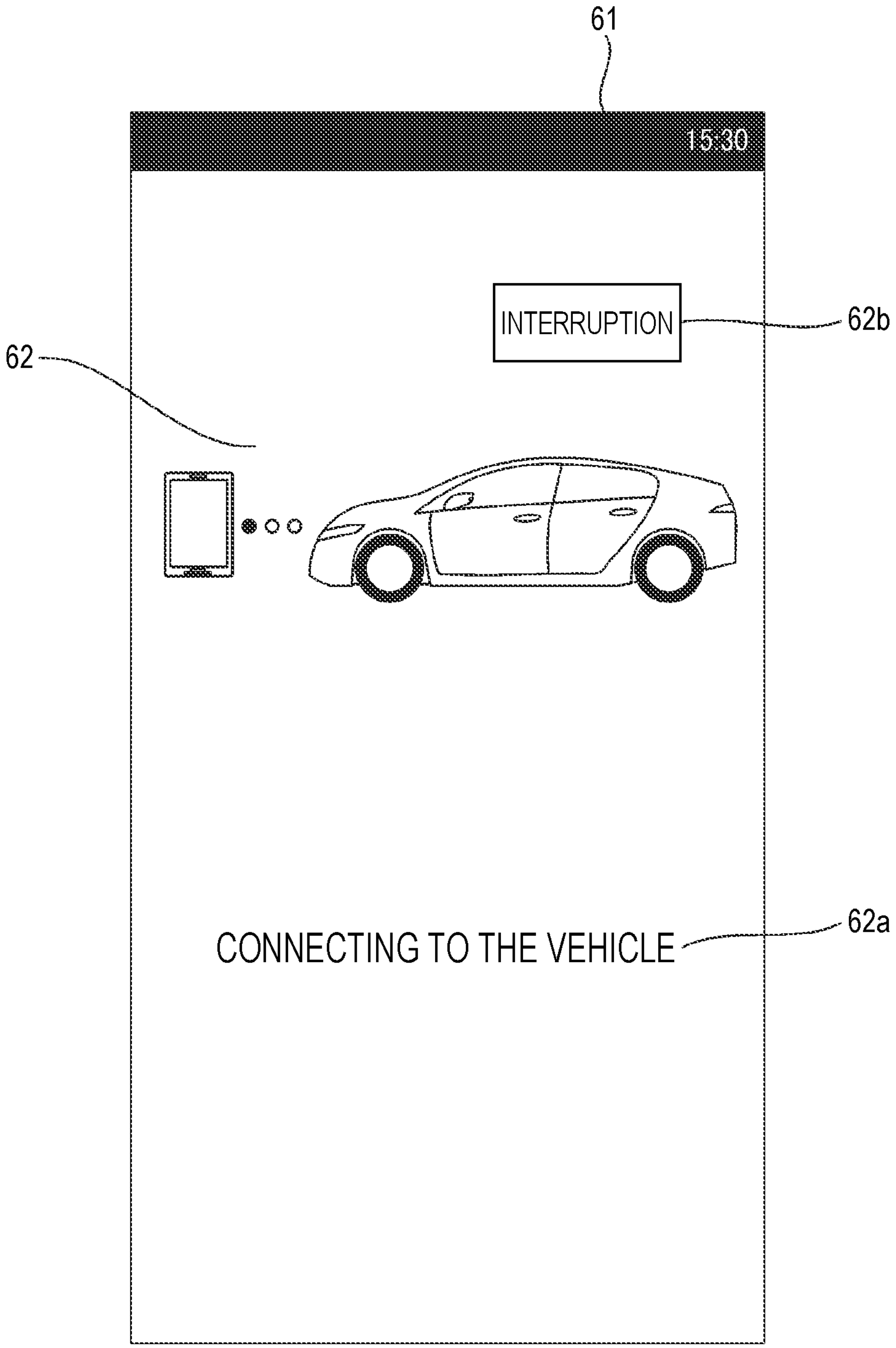
FIG. 9 is a reception screen displayed on the information terminal when a communication connection process is being executed between the vehicle and the information terminal.

First, FIG. 9 is a reception screen 62 displayed on the terminal screen 61 of the information terminal 60 during the process of the communication connection between the vehicle 10 and the information terminal 60 at the start of the automatic exit of the vehicle 10. The processor 81 of the information terminal 60 displays the reception screen 62 on the terminal screen 61, for example, when the automatic exit application is activated. The processor 81 displays on the reception screen 62 a connection message 62*a* indicating that a connection process with the vehicle 10 is in progress, such as "connecting to vehicle", and an interruption button 62*b* for interrupting this connection process.

Figure 10:
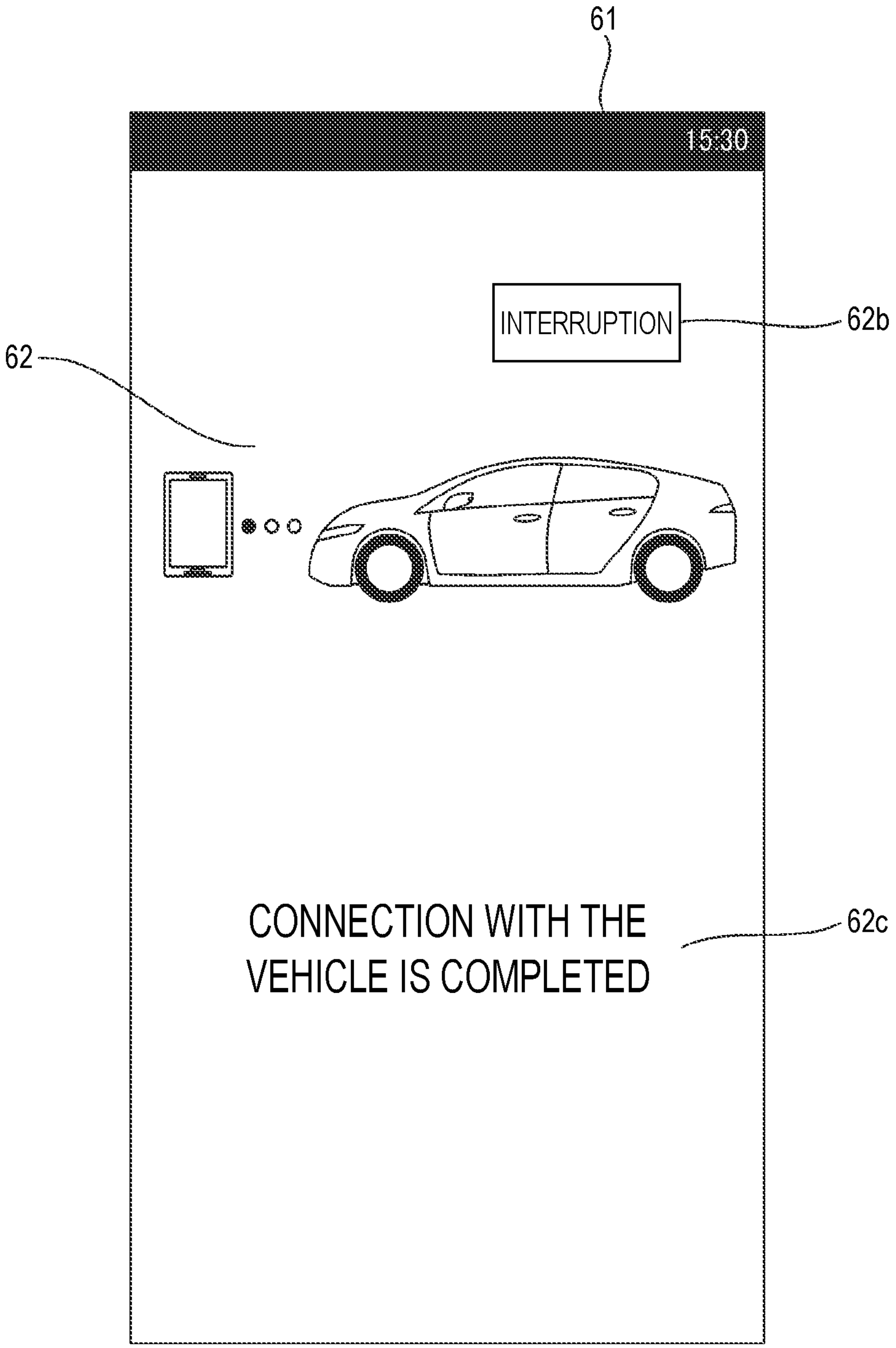
FIG. 10 is a reception screen displayed on the information terminal when the communication connection between the vehicle and the information terminal is completed.

FIG. 10 shows the reception screen 62 displayed on the terminal screen 61 when the communication connection between the vehicle 10 and the information terminal 60 is completed. The processor 81 displays on the reception screen 62 a connection completion message 62*c* indicating that the connection process with the vehicle 10 is completed, such as "connection with the vehicle is completed". The reception screen 62 shown in FIGS. 9 and 10 is, for example, the screen displayed in step S31 of FIG. 7.

FIG. 11 shows a reception screen 63 displayed on the terminal screen 61 when the reception of the ignition ON instruction is started. The processor 81 displays on the reception screen 63 an ignition ON button 63*a* and a start message 63*b* prompting the start of the vehicle 10, such as "starting to exit. Please press POWER button".

Each of FIGS. 12 and 13 is the reception screen 63 displayed on the terminal screen 61 when the ignition ON button 63*a* is tapped. As shown in FIG. 12, the processor 81 displays on the reception screen 63 a start-up message 63*c* indicating that the vehicle 10 is being started, such as "starting the vehicle", and a start-up mark 63*d*. As shown in FIG. 13, the processor 81 displays on the reception screen 63 a start completion message 63*e* indicating that the vehicle 10 is started such as "started". The reception screen 63 of each of FIGS. 11 to 13 is, for example, the screen displayed in step S33 in FIG. 7.

FIGS. 14 and 15 show a reception screen 64 displayed on the terminal screen 61 for receiving the action plan of the vehicle 10. As shown in FIG. 14, at the start of the reception of the action plan, the processor 81 displays on the reception screen 64 a direction selection message 64A prompting the selection of a direction for the exit of the vehicle 10, such as "please select exit direction", and exit direction arrows 64*a* to 64*d* indicating exit directions of the vehicle 10. As shown in FIG. 15, when the action plan is received, the processor 81 displays on the reception screen 64 a direction confirmation message 64*e* indicating the exit direction selected by the user M, such as "exit forward", and a selected exit direction arrow 64*f* indicating the exit direction. Furthermore, the processor 81 displays on the reception screen 64 an OK button 64*g* for deciding the exit direction and a reselection button 64*h* for reselecting the exit direction. The reception screen 64 shown in FIGS. 14 and 15 is, for example, the screen displayed in step S38 of FIG. 7.

FIG. 16 is a charge wait screen 65 displayed on the terminal screen 61 when waiting for charging the sub-power supply 142. The processor 81 displays on the reception screen 63 a charge wait message 65*a* that gives a notification of waiting for charging the sub-power supply 142, such as "preparing for remote exit, time will take up to 20 seconds", and a progress bar 65*b* indicating the progress state of the charge. The charge wait message 65*a* shown in FIG. 16 indicates that the time until the charge control on the sub-power supply 142 is completed is 20 seconds. The progress bar 65*b* indicates that the charge progress rate of the sub-power supply 142 is currently 60%. In this way, the charge wait screen 65 is displayed as a progress bar indicating the time until the charge control is completed, and thus, the user M may easily recognize the time. Therefore, it may be possible to make the user M feel that the time to wait for the charge control is short, and to reduce the annoyance caused by the display on the terminal screen 61.

The extension of the progress bar 65*b* is the ratio of the current elapsed time to the time required for the charge control, and an extension speed is constant regardless of the charge rate of the sub-power supply 142. Since the extension speed of the progress bar is constant, a waiting time for the charge control on the sub-power supply 142 may be felt to be short. A starting point 65*c* of the progress bar 65*b* indicates the progress state of charging at the time when the charge control on the sub-power supply 142 is started. The starting point 65*c* of the progress bar 65*b* may indicate the progress state of the charge when the charge wait screen 65 starts to be displayed on the terminal screen 61, for example. In this way, by setting the progress state at the start time of the charge control as the starting point of the progress bar, or by setting the progress state at the start time of displaying the charge wait screen 65 as the starting point of the progress bar, the time to wait for the charge control on the sub-power supply 142 may be felt to be short.

FIG. 17 is a reception screen 66 displayed on the terminal screen 61 for receiving the movement control execution instruction by the user M. The processor 81 displays on the reception screen 66 a movement icon 66*a* that moves following a touch position in a rotation swiping operation by the user M, for example. The processor 81 displays a guide message 66*b* for executing the automatic exit of the vehicle 10 or stopping the automatic exit of the vehicle 10, such as "exit by rotation swiping" or "release finger and stop". The processor 81 displays an execution state image 66*c* indicating the execution state of the exit control for the vehicle 10 (how the vehicle moves) above a region where the movement icon 66*a* is displayed. Further, the processor 81 displays on a right side of the execution state image 66*c* a caution message 66*d* to alert the user M who performs the instruction operation, such as "please directly check surroundings", and an interruption button 66*e* that interrupts the automatic exit control. The processor 81 executes the movement control on the vehicle 10 based on a continuous swiping operation by the user M on the reception screen 66, the rotation swiping operation in a predetermined rotation direction, and the like. The reception screen 66 of FIG. 17 is, for example, the screen displayed in step S43 of FIG. 7.

<Movement Control on Vehicle 10 Led by Information Terminal 60>

Next, an example of the exit control on the vehicle 10 led by the processor 81 of the information terminal 60 will be described with reference to FIGS. 18 to 20.

Figure 18:
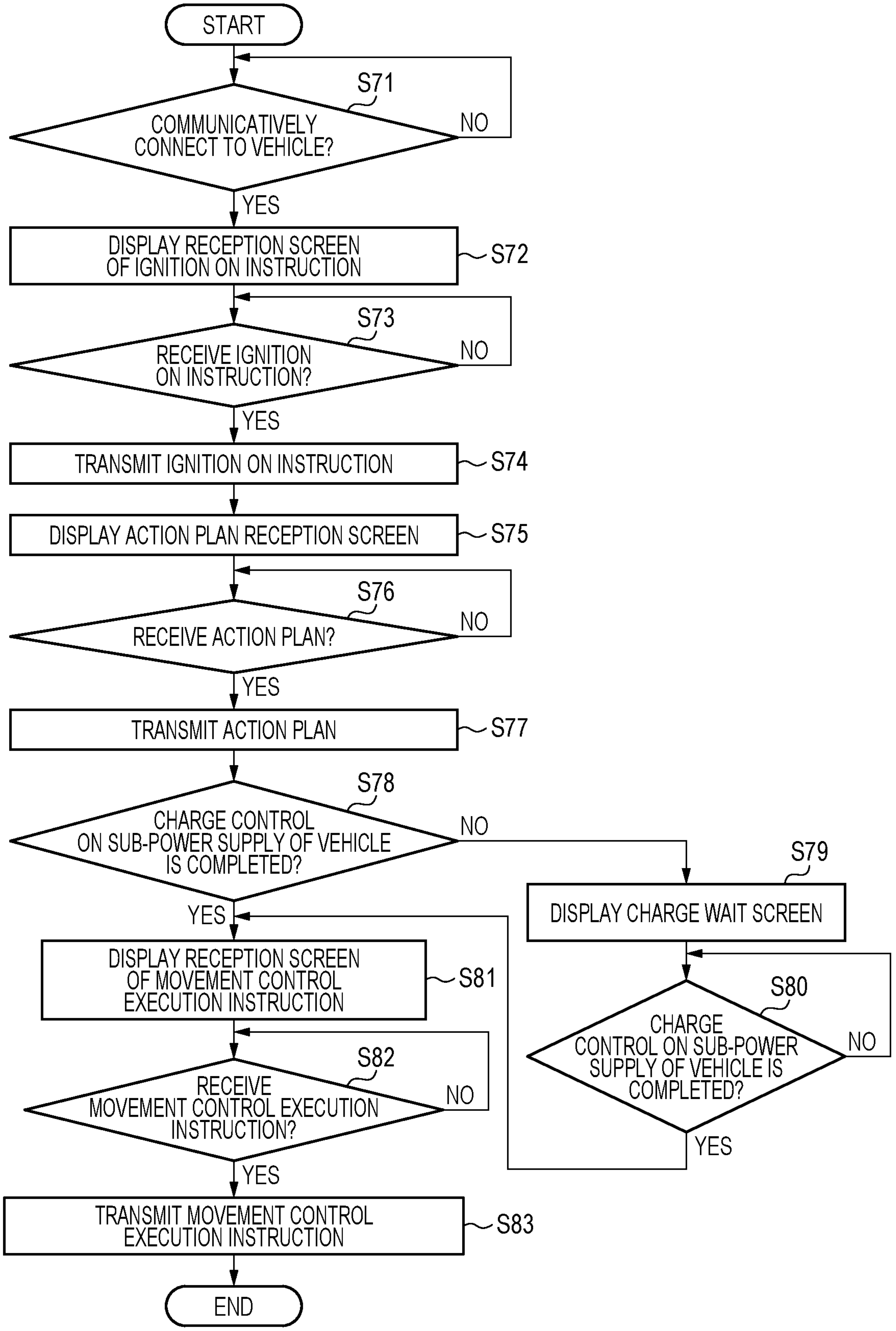
FIG. 18 is a flowchart of exit control by a processor when the vehicle performs the automatic exit.

FIG. 18 is a flowchart showing the exit control of the processor 81 when the vehicle 10 performs the automatic exit.

A situation when the vehicle 10 performs the automatic exit is the same as the situation described with reference to FIG. 6, and the vehicle 10 is parked in the parking lot. The user M is at a place a little away from the vehicle 10 and is about to cause the vehicle 10 to automatically exit from the parking lot. The user M carries the information terminal 60.

The processor 81 of the information terminal 60 determines whether the information terminal 60 is connected with the vehicle 10 by wireless communication (step S71). The communication connection is made possible by the information terminal 60 activating the automatic exit application and transmitting the connection request to the vehicle 10.

In step S71, in a case where the communication connection with the vehicle 10 is not established (step S71: No), the processor 81 repeats the process of step S71 until the communication connection is established. In step S71, in a case where the communication connection with the vehicle 10 is established (step S71: Yes), the processor 81 displays on the terminal screen 61 the reception screen of the ignition ON instruction for turning on the ignition of the vehicle 10 (step S72). In a case where it is determined in step S71 that the information terminal 60 is communicatively connected to the vehicle 10, the processor 81 may confirm with the vehicle 10 whether the ignition of the vehicle 10 is in an OFF state. An example of the reception screen of the ignition ON instruction is the reception screen 63 in FIG. 11.

Next, the processor 81 determines whether the operation of the ignition ON instruction for turning on the ignition of the vehicle 10 is received (step S73).

In step S73, in a case where the operation of the ignition ON instruction is not received (step S73: No), the processor 81 repeats the process of step S73 until the operation is received. In step S73, in a case where the operation of the ignition ON instruction is received (step S73: Yes), the processor 81 transmits the ignition ON instruction to the vehicle 10 to turn on the ignition (step S74).

Next, the processor 81 displays on the terminal screen 61 the action plan reception screen that allows the user to input the action plan of the vehicle 10 (step S75). Before displaying the action plan reception screen, the processor 81 may confirm with the vehicle 10 whether the ignition of the vehicle 10 is in an ON state. An example of the action plan reception screen is the reception screen 64 of FIG. 14.

Next, the processor 81 determines whether the input operation of the action plan is received on the action plan reception screen displayed in step S75 (step S76).

In step S76, in a case where the input operation of the action plan is not received (step S76: No), the processor 81 repeats the process of step S76 until the action plan is received. In step S76, in a case where the input operation of the action plan is received (step S76: Yes), the processor 81 transmits the received action plan to the vehicle 10 (step S77).

Next, the processor 81 determines whether the charge control on the sub-power supply 142 of the vehicle 10 is completed (step S78). Whether the charge control on the sub-power supply 142 is completed is determined, for example, based on charge progress information of the sub-power supply 142 transmitted from the vehicle 10.

In step S78, in a case where the charge control on the sub-power supply 142 is not completed (step S78: No), the processor 81 displays on the terminal screen 61 the charge wait screen for waiting for the charge complete of the sub-power supply 142 (step S79). An example of the charge wait screen is the charge wait screen 65 in FIG. 16.

Next, the processor 81 determines whether the charge control on the sub-power supply 142 of the vehicle 10 is completed (step S80). Whether the charge control on the sub-power supply 142 is completed is determined, for example, based on the charge progress information transmitted from the vehicle 10, as described above.

In step S80, in a case where the charge control on the sub-power supply 142 is not completed (step S80: No), the processor 81 repeats the process of step S80 until the charge control is completed. In step S80, in a case where the charge control on the sub-power supply 142 is completed (step S80: Yes), the processor 81 displays on the terminal screen 61 the reception screen of the movement control execution instruction for allowing the user M to give an instruction of the execution of the movement control on the vehicle 10 (step S81). An example of the reception screen of the movement control execution instruction is the reception screen 66 in FIG. 17.

On the other hand, in a case where it is determined in step S78 that the charge control on the sub-power supply 142 is completed (step S78: Yes), the processor 81 also proceeds to step S81, and displays the reception screen of the movement control execution instruction on the terminal screen 61 (step S81).

Next, the processor 81 determines whether an operation of the movement control execution instruction is received on the reception screen of the movement control execution instruction displayed in step S81 (step S82).

In step S82, in a case where the movement control execution instruction is not received (step S82: No), the processor 81 repeats the process of step S82 until movement control execution instruction is received. In step S82, in a case where the movement control execution instruction is received (step S82: Yes), the processor 81 transmits the received movement control execution instruction to the vehicle 10 (step S83).

Figure 19:
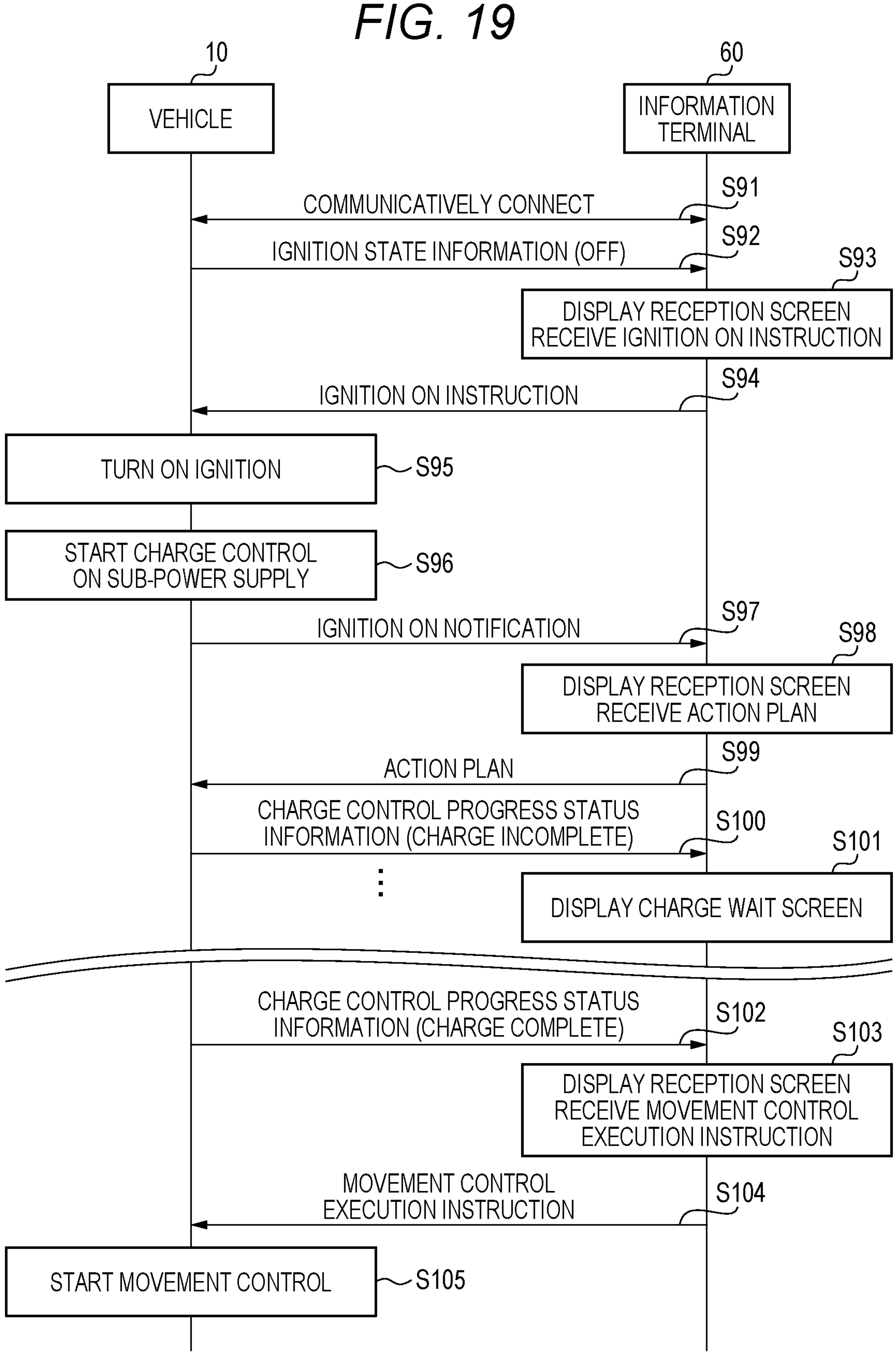
FIG. 19 is a sequence diagram showing an example of operations of the information terminal and the vehicle when the vehicle performs the automatic exit.

FIG. 19 is a sequence diagram showing an example of the operations of the information terminal 60 and the vehicle 10 when the vehicle 10 performs the automatic exit.

A situation when the vehicle 10 performs the automatic exit is the same as the situation described with reference to FIG. 18, and the vehicle 10 is parked in the parking lot. The user M is at a place a little away from the vehicle 10 and is about to cause the vehicle 10 to automatically exit from the parking lot. The user M carries the information terminal 60.

The information terminal 60 activates an automatic exit application, and transmits a communication connection request to the vehicle 10. The vehicle 10 receives the communication connection request from the information terminal 60, so that the information terminal 60 and the vehicle 10 are connected and become communicable with each other (step S91).

Next, the vehicle 10 transmits to the information terminal 60 ignition state information (OFF) indicating that the ignition of the vehicle 10 is turned off (step S92).

Next, after confirming the ignition state information (OFF) received from the vehicle 10 in step S92, the information terminal 60 displays the reception screen of the ignition ON instruction on the terminal screen 61, and receives an ignition ON instruction from the user M on the reception screen (step S93). An Example of the reception screen of the ignition ON instruction is the reception screen 63 in each of FIGS. 11 to 13.

Next, in response to receiving the ON instruction from the user M in step S93, the information terminal 60 transmits the ignition ON instruction for turning on the ignition to the vehicle 10 (step S94).

Next, in response to the ignition ON instruction being receiver by the vehicle 10 from the information terminal 60 in step S94, the ignition of the vehicle 10 is turned ON (step S95).

Next, the vehicle 10 starts the charge control for charging the battery of the sub-power supply 142 of the vehicle 10 (step S96).

Next, the vehicle 10 transmits to the information terminal 60 an ignition ON notification that gives a notification that the ignition of the vehicle 10 is turned on (step S97).

Next, after confirming the ignition ON notification received from the vehicle 10 in step S97, the information terminal 60 displays on the terminal screen 61 the action plan reception screen, and receives the action plan instruction from the user M on the reception screen (step S98). An example of the action plan reception screen is the reception screen 64 in FIG. 14, and an example of the screen for receiving the action plan instruction is the reception screen 64 in FIG. 15.

Next, in response to receiving the action plan instruction from the user M in step S98, the information terminal 60 transmits the action plan to the vehicle 10 (step S99).

Next, in response to receiving the action plan from the information terminal 60, the vehicle 10 determines whether the charge control on the sub-power supply 142 started in step S96 is completed, and in a case where the charge of the sub-power supply 142 is not yet completed, the vehicle 10 transmits to the information terminal 60 charge control progress status information (charge incomplete) that gives a notification that a progress status of the charge control is the charge incomplete (step S100).

Next, after confirming the charge control progress status information (charge incomplete) received from the vehicle 10 in step S100, the information terminal 60 displays the charge wait screen on the terminal screen 61 (step S101). An example of the charge wait screen is the charge wait screen 65 in FIG. 16.

Next, after waiting for charging for a predetermined period, in a case where the charge of the sub-power supply 142 started in step S96 is completed, the vehicle 10 transmits to the information terminal 60 charge control progress status information (charge complete) that gives a notification that the progress state of the charge control is the charge complete (step S102).

Next, after confirming the charge control progress status information (charge complete) received from the vehicle 10 in step S102, the information terminal 60 displays the reception screen of the movement control execution instruction on the terminal screen 61, and receives the movement control execution instruction from the user M on the reception screen (step S103). An example of the reception screen of the movement control execution instruction is the reception screen 66 in FIG. 17.

Next, in response to receiving the movement control execution instruction from the user M in step S103, the information terminal 60 transmits the movement control execution instruction for executing the movement control to the vehicle 10 (step S104).

Next, the vehicle 10 starts the movement control for causing the vehicle 10 to automatically exit from the parking lot (step S105).

As described above, the information terminal 60 transmits the ignition ON instruction to the vehicle 10 based on the operation on the information terminal 60 by the user M to start the vehicle 10 and start the charge control on the sub-power supply 142. Then, the charge control on the sub-power supply 142 is executed even while the input operation of the action plan related to the automatic exit of the vehicle 10 is received from the user M, and after the reception of the action plan from the user M is finished, the terminal screen 61 displays the charge wait screen (third display image) showing the progress state of the charge control. Therefore, the charge wait screen is not displayed on the terminal screen 61 while the user M is performing the input operation for the action plan related to the automatic exit of the vehicle 10, and thus, it may be possible to make the user M feel that the time to wait for the charge control on the sub-power supply 142 is short.

Figure 20:
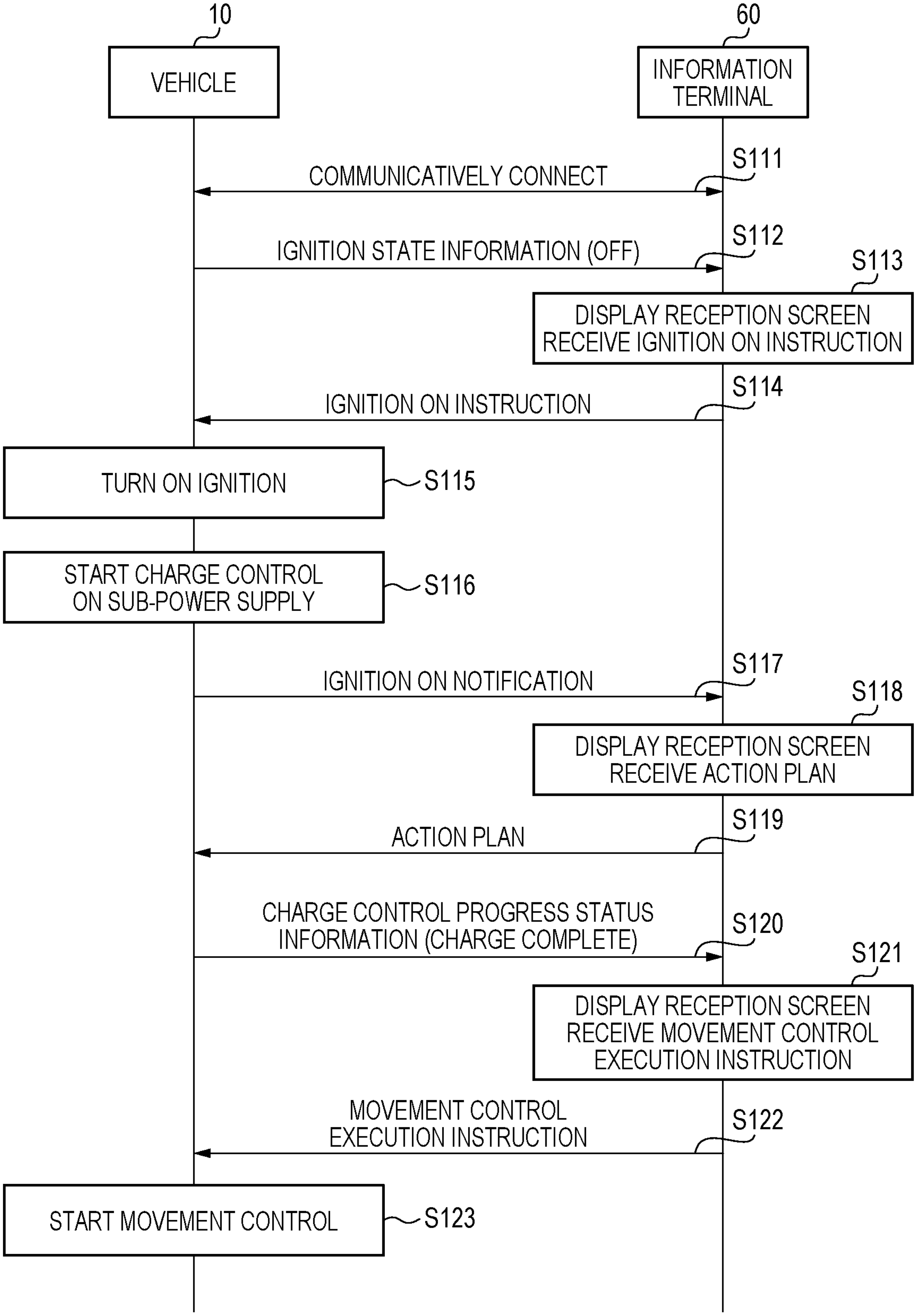
FIG. 20 is a sequence diagram showing another example of the operations of the information terminal and the vehicle when the vehicle performs the automatic exit.

FIG. 20 is a sequence diagram showing another example of the operations of the information terminal 60 and the vehicle 10 when the vehicle 10 performs the automatic exit. In the operation example illustrated in FIG. 19, the charge of the sub-power supply 142 is not yet completed when the action plan is transmitted from the information terminal 60 to the vehicle 10, whereas the operation example of FIG. 20 differs from the operation example of FIG. 19 in that the charge of the sub-power supply 142 is completed when the action plan is transmitted.

As shown in FIG. 20, in this operation example, processes from step S111 to step S119 are the same as the processes from step S91 to step S99 in the operation example described with reference to FIG. 19. Therefore, descriptions of steps S111 to S119 are omitted.

Next, in response to receiving the action plan from the information terminal 60 in step S119, the vehicle 10 determines whether the charge control on the sub-power supply 142 started in step S116 is completed, and in a case where the charge of the sub-power supply 142 is completed, the vehicle 10 transmits to the information terminal 60 the charge control progress status information (charge complete) that give a notification that the progress status of the charge control is the charge complete (step S120). That is, when the vehicle 10 receives the action plan from the information terminal 60, in a case where the charge of the sub-power supply 142 has already been completed, since the vehicle 10 does not transmit the progress status information of the charge incomplete to the information terminal 60, the information terminal 60 does not display the charge wait screen on the terminal screen 61.

The processes from step S121 to step S123 are the same as the processes from step S103 to step S105 described in FIG. 19. Therefore, descriptions of steps S121 to S123 are omitted.

As described above, in response to receiving the action plan related to the automatic exit of the vehicle 10 from the user M, in a case where the progress state of the charge control on the sub-power supply 142 reaches the state where the charge is completed, the information terminal 60 of the present operation example does not display the progress state on the terminal screen 61, that is, does not display the charge wait screen (third display image) on the terminal screen 61. Therefore, it is possible to reduce the annoyance of the user M that the charge wait screen is displayed on the terminal screen 61.

The control method described in the above embodiments may be implemented by executing a control program prepared in advance on a computer. The control program is recorded in a computer-readable storage medium and executed by being read from the storage medium. In addition, the control program may be provided in a form stored in a non-transitory storage medium such as a flash memory, or may be provided via a network such as the Internet. The computer that executes this control program may be included in the control device, may be included in an electronic device such as a smartphone, a tablet terminal, or a personal computer that is communicable with a control device, or may be included in a server device capable of communicating with these control devices and electronic devices.

Although the embodiments of the present invention have been described above, the present invention is not limited to the above embodiments, and may be modified, improved, and the like as appropriate.

For example, in the above embodiment, an example in which the vehicle (four-wheeled automobile) is used as a moving body has been described, but the present invention is not limited thereto. For example, the vehicle may be a two-wheeled vehicle, a Segway, or the like. Furthermore, the idea of the present invention is not limited to vehicles, but may be applied to robots, ships, aircraft, and the like that are equipped with a drive source and can move by power of the drive source.

In the present specification, at least the following matters are described. Although corresponding constituent elements or the like in the above-described embodiments are shown in parentheses, the present invention is not limited thereto.

(1) A control device (control ECU 20) for a moving body (vehicle 10), including:

a control unit (calculation unit 52) configured to communicate with an information terminal (information terminal 60) which is portable for a user (user M) of the moving body, perform movement control on the moving body, and perform charge control on a power supply device (sub-power supply 142) for the movement control, in which the control unit is configured to:

cause a display unit (terminal screen 61) of the information terminal to display a first display image (reception screen of ignition ON instruction) for starting the moving body, start the moving body and start the charge control based on an operation by the user on the first display image, cause the display unit to display a second display image (action plan reception screen) for receiving an action plan of the movement control along with the start of the moving body, receive the action plan based on an operation by the user on the second display image, and in response to receiving the action plan, in a case where a progress state of the charge control does not reach a predetermined state, cause the display unit to display a third display image (charge wait screen) indicating the progress state, and in a case where the progress state reaches the predetermined state, cause the display unit not to display the third display image, or cause the display unit to display the third display image in an inconspicuous manner in comparison to a case where the progress state does not reach the predetermined state.

According to (1), when the moving body is started in response to the operation by the user, the charge control on the power supply device is performed even while the action plan is received from the user, and the progress state is displayed after receiving the action plan from the user. Therefore, it may be possible to make the user feel that a time to wait for the charge control on the power supply device is short. After receiving the action plan from the user, in a case where the progress state of the charge control on the power supply device reaches the predetermined state, the progress state is not displayed, thereby reducing annoyance of the user.

(2) The control device according to (1), in which the progress state includes at least any one of a progress rate of the charge control, a time until the charge control is completed, a charge amount of the power supply device, and a charge rate of the power supply device.

These items according to (2) are preferable as the charge progress state to be notified to the user.

(3) The control device according to (1) or (2), in which the third display image includes an image indicating a time until the charge control is completed.

According to (3), it is preferable for the user to be able to recognize the time until the charge control is completed.

(4) The control device according to any one of (1) to (3), in which the third display image includes a progress bar indicating the progress state.

According to (4), the progress state may be easily recognized by displaying the progress bar.

(5) The control device according to (4), in which the progress bar indicates the progress state at a current time with the progress state at a start time of the charge control as a starting point.

According to (5), by setting the progress state at the start time of the charge control as the starting point of the progress bar, the time to wait for the charge control on the power supply device may be felt to be short.

(6) The control device according to (4), in which the progress bar indicates the progress state at a current time with the progress state at a start time of displaying the third display image as a starting point.

According to (6), by setting the progress state at the start time of displaying the third display image as the starting point of the progress bar, the time to wait for the charge control on the power supply device may be felt to be short.

(7) The control device according to any one of (4) to (6), in which the progress state is a ratio of an elapsed time at a current time to a time required for the charge control.

According to (7), an extension speed of the progress bar may be made constant regardless of the charge rate of the power supply device, and thus, the time to wait for the charge control on the power supply device may be felt to be short.

(8) The control device according to any one of (1) to (7), in which the control unit restricts the movement control when at least any one of the power supply device and the charge control has abnormality.

According to (8), it is preferable to set a restriction on the movement of the moving body when there is an abnormality in the power supply device or the charge control.

(9) The control device according to any one of (1) to (8), in which the control unit causes the display unit to display a fourth display image (reception screen of movement control execution instruction) for receiving a movement control instruction after the charge control is completed.

According to (9), since the image for receiving the movement control instruction of the moving body is displayed after the charge control is completed, the moving body may be moved according to the movement control instruction of the user without wait time.

(10) The control device according to any one of (1) to (9), in which the power supply device is a sub-power supply for decelerating or stopping the moving body when a main power supply of the moving body fails.

According to (10), the charge control on the sub-power supply is required when the moving body starts to move, and thus, it is preferable to display the charge wait display at an appropriate timing if necessary.

(11) A control method performed by a control device including a control unit configured to communicate with an information terminal which is portable for a user of a moving body, perform movement control on the moving body, and perform charge control on a power supply device for the movement control, the control method including causing, by the control unit, a display unit of the information terminal to display a first display image for starting the moving body, starting, by the control unit, the moving body and start the charge control based on an operation by the user on the first display image, causing, by the control unit, the display unit to display a second display image for receiving an action plan of the movement control along with the start of the moving body, receiving, by the control unit, the action plan based on an operation by the user on the second display image, and in response to receiving the action plan, in a case where a progress state of the charge control does not reach a predetermined state, causing, by the control unit, the display unit to display a third display image indicating the progress state, and in a case where the progress state reaches the predetermined state, causing, by the control unit, the display unit not to display the third display image, or causing, by the control unit, the display unit to display the third display image in an inconspicuous manner in comparison to a case where the progress state does not reach the predetermined state.

According to (11), similarly to (1), it may be possible to make the user feel that the time to wait for the charge control on the power supply device is short, and to reduce the user's annoyance.

(12) A non-transitory computer readable storage medium storing a control program for a control device including a control unit configured to communicate with an information terminal which is portable for a user of a moving body, perform movement control on the moving body, and perform charge control on a power supply device for the movement control, the control program causing the control unit to execute a process including causing a display unit of the information terminal to display a first display image for starting the moving body, starting the moving body and starting the charge control based on an operation by the user on the first display image, causing the display unit to display a second display image for receiving an action plan of the movement control along with the start of the moving body, receiving the action plan based on an operation by the user on the second display image, and in response to receiving the action plan, in a case where a progress state of the charge control does not reach a predetermined state, causing the display unit to display a third display image indicating the progress state, and in a case where the progress state reaches the predetermined state, causing the display unit not to display the third display image, or causing the display unit to display the third display image in an inconspicuous manner than if the progress state does not reach the predetermined state.

According to (12), similarly to (1), it may be possible to make the user feel that the time to wait for the charge control on the power supply device is short, and to reduce the user's annoyance.

(13) An information terminal which is portable for a user of a moving body, the information terminal including:

a control unit (processor 81) configured to communicate with a control device of the moving body; and a display unit, in which the moving body is configured to perform movement control on the moving body and perform charge control on a power supply device for the movement control, and the control unit is configured to:

cause the display unit to display a first display image for starting the moving body, start the moving body and start the charge control with respect to the control device based on an operation by the user on the first display image, cause the display unit to display a second display image for receiving an action plan of the movement control along with the start of the moving body, receive the action plan based on an operation by the user on the second display image, and in response to receiving the action plan, in a case where a progress state of the charge control does not reach a predetermined state, cause the display unit to display a third display image indicating the progress state, and in a case where the progress state reaches the predetermined state, cause the display unit not to display the third display image, or cause the display unit to display the third display image in an inconspicuous manner in comparison to a case where the progress state does not reach the predetermined state.

According to (13), when the moving body is started in response to the operation by the user, the charge control on the power supply device is executed even while the action plan is received from the user, and the progress state is displayed on the display unit in response to receiving the action plan from the user. Therefore, it may be possible to make the user feel that a time to wait for the charge control on the power supply device is short. After receiving the action plan from the user, in a case where the progress state of the charge control on the power supply device reaches the predetermined state, the progress state is not displayed, thereby reducing annoyance of the user.

(14) A control method performed by an information terminal which is portable for a user of a moving body and includes a control unit configured to communicate with a control device of the moving body, and a display unit, the moving body being configured to perform movement control on the moving body and perform charge control on a power supply device for the movement control, the control method including causing, by the control unit, a display unit to display a first display image for starting the moving body, starting, by the control unit, the moving body and start the charge control with respect to the control device based on an operation by the user on the first display image, causing, by the control unit, the display unit to display a second display image for receiving an action plan of the movement control along with the start of the moving body, receiving, by the control unit, the action plan based on an operation by the user on the second display image, and in response to receiving the action plan, in a case where a progress state of the charge control does not reach a predetermined state, causing, by the control unit, the display unit to display a third display image indicating the progress state, and in a case where the progress state reaches the predetermined state, causing, by the control unit, the display unit not to display the third display image, or causing, by the control unit, the display unit to display the third display image in an inconspicuous manner in comparison to a case where the progress state does not reach the predetermined state.

According to (14), similarly to (13), it may be possible to make the user feel that the time to wait for the charge control on the power supply device is short, and to reduce the user's annoyance.

(15) A non-transitory computer readable storage medium storing a control program for an information terminal which is portable for a user of a moving body and includes a control unit configured to communicate with a control device of the moving body, and a display unit, the moving body being configured to perform movement control on the moving body and perform charge control on a power supply device for the movement control, the control program causing the control unit to execute a process comprising causing the display unit to display a first display image for starting the moving body, starting the moving body and starting the charge control with respect to the control device based on an operation by the user on the first display image, causing the display unit to display a second display image for receiving an action plan of the movement control along with the start of the moving body, receiving the action plan based on an operation by the user on the second display image, and in response to receiving the action plan, in a case where a progress state of the charge control does not reach a predetermined state, causing the display unit to display a third display image indicating the progress state, and in a case where the progress state reaches the predetermined state, causing the display unit not to display the third display image, or causing the display unit to display the third display image in an inconspicuous manner in comparison to a case where the progress state does not reach the predetermined state.

According to (15), similarly to (13), it may be possible to make the user feel that the time to wait for the charge control on the power supply device is short, and to reduce the user's annoyance.

What is claimed is:

1. A control device for a moving body, comprising:

a control unit configured to communicate with an information terminal which is portable for a user of the moving body, perform movement control on the moving body, and perform charge control on a power supply device for the movement control, wherein the control unit is configured to:

cause a display unit of the information terminal to display a first display image for starting the moving body, start the moving body and start the charge control based on an operation by the user on the first display image, cause the display unit to display a second display image for receiving an action plan of the movement control along with the start of the moving body, receive the action plan based on an operation by the user on the second display image, and in response to receiving the action plan, in a case where a progress state of the charge control does not reach a predetermined state, cause the display unit to display a third display image indicating the progress state, and in a case where the progress state reaches the predetermined state, cause the display unit not to display the third display image, or cause the display unit to display the third display image in an inconspicuous manner in comparison to a case where the progress state does not reach the predetermined state.

2. The control device according to claim 1, wherein the progress state includes at least any one of a progress rate of the charge control, a time until the charge control is completed, a charge amount of the power supply device, or a charge rate of the power supply device.

3. The control device according to claim 1, wherein the third display image includes an image indicating a time until the charge control is completed.

4. The control device according to claim 1, wherein the third display image includes a progress bar indicating the progress state.

5. The control device according to claim 4, wherein the progress bar indicates the progress state at a current time with the progress state at a start time of the charge control as a starting point.

6. The control device according to claim 4, wherein the progress bar indicates the progress state at a current time with the progress state at a start time of displaying the third display image as a starting point.

7. The control device according to claim 4, wherein the progress state is a ratio of an elapsed time at a current time to a time required for the charge control.

8. The control device according to claim 1, wherein the control unit restricts the movement control when at least any one of the power supply device and the charge control has abnormality.

9. The control device according to claim 1, wherein the control unit causes the display unit to display a fourth display image for receiving a movement control instruction after the charge control is completed.

10. The control device according to claim 1, wherein the power supply device is a sub-power supply for decelerating or stopping the moving body when a main power supply of the moving body fails.

11. A control method performed by a control device including a control unit configured to communicate with an information terminal which is portable for a user of a moving body, perform movement control on the moving body, and perform charge control on a power supply device for the movement control, the control method comprising causing, by the control unit, a display unit of the information terminal to display a first display image for starting the moving body, starting, by the control unit, the moving body and start the charge control based on an operation by the user on the first display image, causing, by the control unit, the display unit to display a second display image for receiving an action plan of the movement control along with the start of the moving body, receiving, by the control unit, the action plan based on an operation by the user on the second display image, and in response to receiving the action plan, in a case where a progress state of the charge control does not reach a predetermined state, causing, by the control unit, the display unit to display a third display image indicating the progress state, and in a case where the progress state reaches the predetermined state, causing, by the control unit, the display unit not to display the third display image, or causing, by the control unit, the display unit to display the third display image in an inconspicuous manner in comparison to a case where the progress state does not reach the predetermined state.

12. A non-transitory computer readable storage medium storing a control program for a control device to execute the control method according to claim 11.

13. An information terminal which is portable for a user of a moving body, the information terminal comprising:

a control unit configured to communicate with a control device of the moving body; and a display unit, wherein the moving body is configured to perform movement control on the moving body and perform charge control on a power supply device for the movement control, and the control unit is configured to:

cause the display unit to display a first display image for starting the moving body, start the moving body and start the charge control with respect to the control device based on an operation by the user on the first display image, cause the display unit to display a second display image for receiving an action plan of the movement control along with the start of the moving body, receive the action plan based on an operation by the user on the second display image, and in response to receiving the action plan, in a case where a progress state of the charge control does not reach a predetermined state, cause the display unit to display a third display image indicating the progress state, and in a case where the progress state reaches the predetermined state, cause the display unit not to display the third display image, or cause the display unit to display the third display image in an inconspicuous manner in comparison to a case where the progress state does not reach the predetermined state.

14. A control method performed by an information terminal which is portable for a user of a moving body and includes a control unit configured to communicate with a control device of the moving body, and a display unit, the moving body being configured to perform movement control on the moving body and perform charge control on a power supply device for the movement control, the control method comprising:

causing, by the control unit, a display unit to display a first display image for starting the moving body, starting, by the control unit, the moving body and start the charge control with respect to the control device based on an operation by the user on the first display image, causing, by the control unit, the display unit to display a second display image for receiving an action plan of the movement control along with the start of the moving body, receiving, by the control unit, the action plan based on an operation by the user on the second display image, and in response to receiving the action plan, in a case where a progress state of the charge control does not reach a predetermined state, causing, by the control unit, the display unit to display a third display image indicating the progress state, and in a case where the progress state reaches the predetermined state, causing, by the control unit, the display unit not to display the third display image, or causing, by the control unit, the display unit to display the third display image in an inconspicuous manner in comparison to a case where the progress state does not reach the predetermined state.

15. A non-transitory computer readable storage medium storing a control program for an information terminal to execute the control method according to claim 14.

* * * * *